(12) United States Patent
Tsai et al.

(10) Patent No.: US 8,823,888 B2
(45) Date of Patent: Sep. 2, 2014

(54) LIQUID CRYSTAL PARALLAX BARRIER WITH STRIP-SHAPED AND STEP-SHAPED ELECTRODES AND APPLICATION THEREOF

(75) Inventors: Meng-Chieh Tsai, Hsin-Chu (TW); Chih-Wen Chen, Hsin-Chu (TW); Chih-Hung Shih, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 637 days.

(21) Appl. No.: 13/092,228

(22) Filed: Apr. 22, 2011

(65) Prior Publication Data

US 2012/0013606 A1 Jan. 19, 2012

(30) Foreign Application Priority Data

Jul. 16, 2010 (TW) ................................ 99123523 A

(51) Int. Cl.
*G02F 1/1335* (2006.01)
*G01C 3/14* (2006.01)
*H04N 13/00* (2006.01)
*G06T 15/00* (2011.01)
*H04N 13/04* (2006.01)
*G02B 27/22* (2006.01)
*G02F 1/133* (2006.01)

(52) U.S. Cl.
CPC ............ *G02B 27/2214* (2013.01); *G02B 27/22* (2013.01); *H04N 13/0409* (2013.01); *G02F 1/133* (2013.01); *G02F 1/1335* (2013.01)
USPC .................... 349/15; 356/12; 348/42; 348/51; 345/419; 359/462

(58) Field of Classification Search
CPC .................. G02B 27/2214; G02B 27/2228
USPC .................... 349/15; 356/12; 345/12
See application file for complete search history.

(56) References Cited

U.S. PATENT DOCUMENTS

| 5,969,850 | A | 10/1999 | Harrold et al. |
| 6,618,109 | B2 | 9/2003 | Hidehira et al. |
| 7,319,502 | B2 | 1/2008 | Chen et al. |

(Continued)

FOREIGN PATENT DOCUMENTS

| TW | 554222 | 9/2003 |
| TW | I236279 | 7/2005 |

(Continued)

OTHER PUBLICATIONS

English language translation of abstract of TW I236279 (published Jul. 11, 2005).

(Continued)

*Primary Examiner* — Hoan C Nguyen
(74) *Attorney, Agent, or Firm* — McClure, Qualey & Rodack, LLP

(57) ABSTRACT

Disclosed herein is a parallax barrier including a first substrate, a second substrate and a liquid crystal layer disposed between the first and the second substrates. A plurality of first strip electrodes and a plurality of second strip electrodes are arranged on the first substrate, whereas a plurality of third electrodes and a plurality of fourth electrodes are arranged on the second substrate. Each of the third electrodes has a step-shaped first portion and each of the fourth electrodes has a step-shaped second portion.

19 Claims, 19 Drawing Sheets

(56) References Cited

U.S. PATENT DOCUMENTS

| | | | |
|---|---|---|---|
| 7,453,529 B2 | 11/2008 | Nam et al. | |
| 7,511,774 B2 | 3/2009 | Lee et al. | |
| 7,733,296 B2 * | 6/2010 | Lee et al. | 345/6 |
| 7,961,260 B2 | 6/2011 | Huang et al. | |
| 8,018,482 B2 * | 9/2011 | Kim et al. | 348/42 |
| 8,537,292 B2 * | 9/2013 | Lin | 349/15 |
| 2009/0140950 A1 | 6/2009 | Woo et al. | |
| 2011/0001894 A1 * | 1/2011 | Owaku et al. | 349/15 |
| 2011/0043715 A1 * | 2/2011 | Ohyama et al. | 349/15 |

FOREIGN PATENT DOCUMENTS

| | | |
|---|---|---|
| TW | 200537220 A | 11/2005 |
| TW | I264600 | 10/2006 |
| TW | 200923474 A | 6/2009 |
| TW | 201019018 A | 5/2010 |

OTHER PUBLICATIONS

English language translation of abstract of TW I264600 (published ).

English translation of the abstract and pertinent parts of TW 201019018 A (published May 16, 2010).

English translation of the abstract and pertinent parts of TW 200537220 A (published Nov. 16, 2005).

English translation of the abstract and pertinent parts of TW 554222 (published Sep. 21, 2003).

English translation of the abstract and pertinent parts of TW 200923474 A (published Jun. 1, 2009).

* cited by examiner

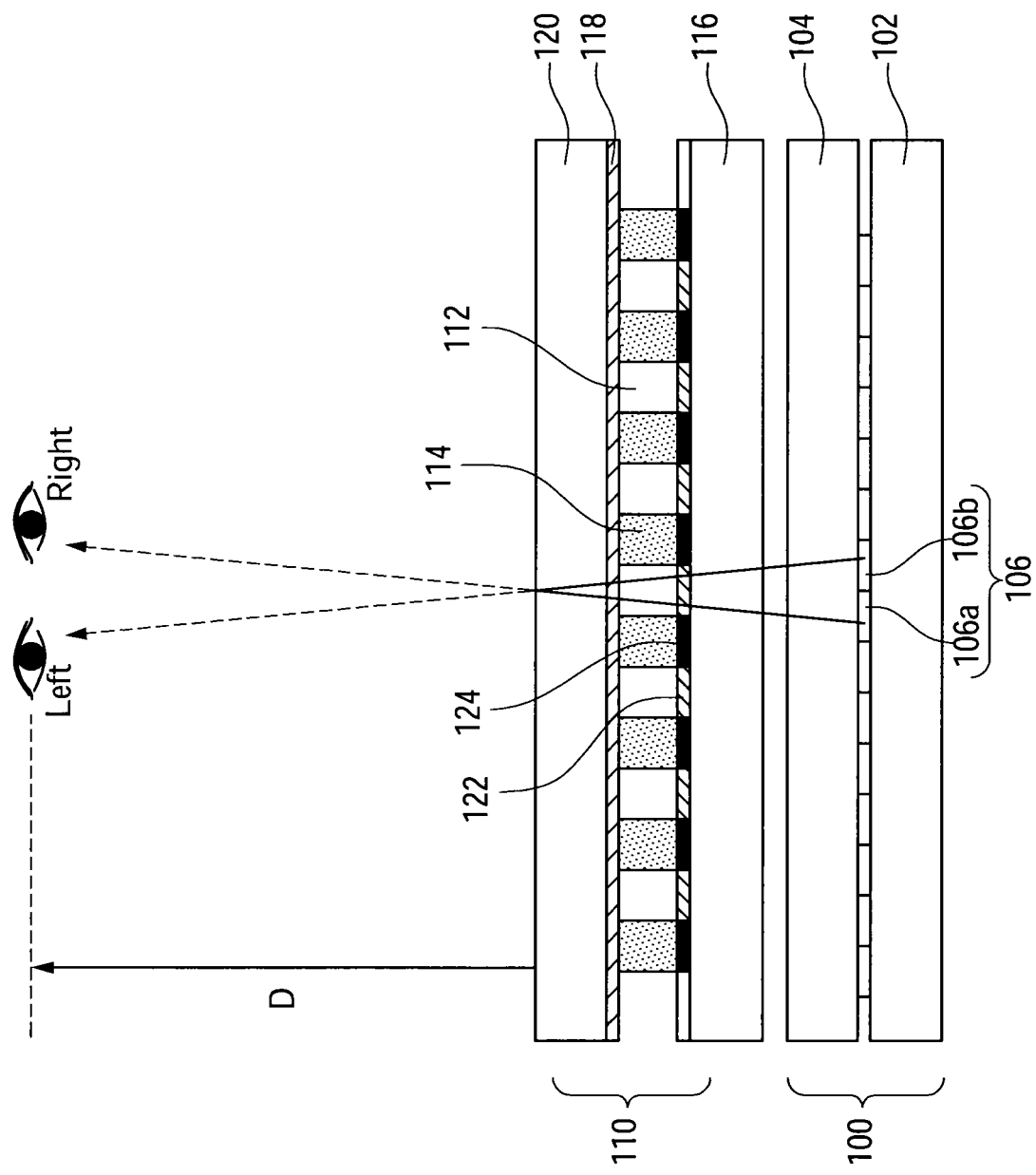

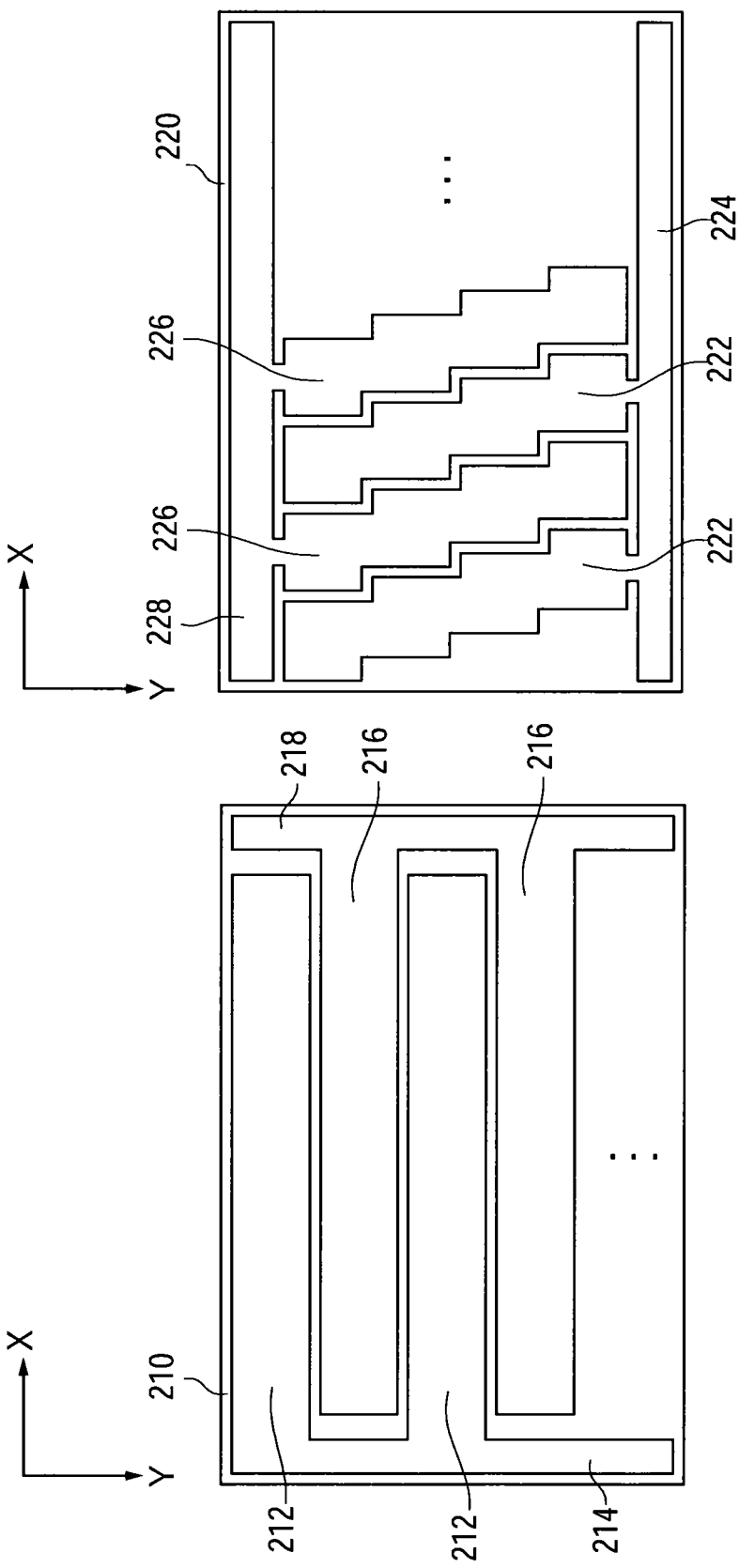

LIQUID CRYSTAL PARALLAX BARRIER WITH STRIP-SHAPED AND STEP-SHAPED ELECTRODES AND APPLICATION THEREOF

RELATED APPLICATIONS

This application claims priority to Taiwan application No. 099123523, filed Jul. 16, 2010, entitled "PARALLAX BARRIER AND APPLICATION THEREOF", the entirety of which is incorporated herein by reference.

BACKGROUND

1. Field of Invention

The present invention relates generally to parallax devices and methods. More particularly, the present invention relates to parallax devices and methods capable of rendering autostereoscopic images in two modes.

2. Description of Related Art

Generally, three-dimensional (3D) displays may be categorized into stereoscopic displays and autostereoscopic displays (also referred to as naked-eye type 3D displays). In stereoscopic technology, users have to wear viewing aids, such as shutter glasses, so that the left and right eyes of a user may receive different images respectively, and thereby, the user may perceive a 3D image. In autostereoscopic technology, a specially designed optical element, such as a parallax barrier, is employed so as to allow the display device to provide different images to the left and right eyes of a user respectively so that the user may perceive a 3D image with naked eyes.

FIG. 1A is a schematic diagram illustrating the operation principle of conventional autostereoscopic displays. As shown in FIG. 1A, the autostereoscopic display comprises a display panel 100 and a parallax barrier 110 disposed above the display face of the display panel 100.

The display panel 100 comprises at least two substrates 102 and 104, and a liquid crystal layer 106 sandwiched therebetween. In addition, the substrate 102 has a pixel array (not shown) consisting of a plurality of pixels disposed thereon, wherein each pixel corresponds to at least one liquid crystal cell (such as, 106a, 106b) of the liquid crystal layer 106.

The parallax barrier 110 comprises: two substrates 116 and 120 opposing each other; twisted nematic cells (TN cells) 112 and 114 disposed between the substrates 116 and 120; two sets of strip electrodes 122 and 124 disposed on a surface of the substrate 116; and a surface electrode 118 substantially cover the whole surface of the substrate 120. As can be appreciated by persons with ordinary skill in the art, such autostereoscopic display may further comprises at least one polarizer (not shown for the sake of brevity); for example, a polarizer may be disposed below the display panel 100, between the display panel 100 and the parallax barrier 110, or above the parallax barrier 110. The strip electrodes 122 and 124 are arranged alternately on the substrate 116, and a strip-shaped parallax structure may be formed by respectively controlling the voltage applied on these electrodes 122 and 124. For example, when the electrode 118 and strip electrode set 122 are connected to ground voltage, whereas another strip electrode set 124 is connected to a high voltage, the TN cells 112 corresponding to the ground electrode set 122 are not driven; whereas TN cells 114 corresponding to the strip electrode set 124 (electrically connected to the high voltage) are drives. As such, when the image (light) rendered by display panel 100 passes through the parallax barrier 110, light cannot pass through the driven TN cells 114, and can merely pass through the non-driven TN cells 112; therefore, the image rendered by the display panel 100 would be transformed into an image with a parallax barrier pattern (referred to as a "parallax image" hereinbelow) that is capable of providing a left-eye image (such as the image from the pixels corresponding to liquid crystal cells 106b) and a right-eye image (such as the image from the pixels corresponding to liquid crystal cells 106a) respectively to a user's left and right eyes, and the user's brain, upon receiving the signals of the left- and right-eye images, may perceive a three-dimensional image.

Nowadays, many display devices can rotate with respect to a base or a body of an electronic device and provide images under different viewing/operating modes. For example, a display is under a landscape mode when the display is horizontally oriented (that is, the long side of the display is oriented to be horizontal); whereas a display is under a portrait mode when the display is vertically oriented (that is, the long side of the display is oriented to be vertical). However, the conventional parallax barrier as described in FIG. 1A is capable of rendering the parallax image merely in a single mode. For example, as shown in FIG. 1B, the display can only provide a three-dimensional image under the portrait mode when the strip electrode sets 152 and 154 of the parallax barrier 150 are disposed parallel to the long sides of the display device. More specifically, in this case, the image rendered by pixels 162a and 162b of the display panel 160 may pass through the TN cells (not shown) corresponding to the electrodes 152 that are connected to electrical ground, thereby providing a left-eye image (such as, an image corresponding to the image from pixels 160b) and a right-eye image (such as, an image corresponding to the image from pixels 160a) respectively to the user's left and right eyes, so that the user's brain may perceive a three-dimensional image.

Considerable problems are faced in designing displays that can render three-dimensional image under both the landscape mode and the portrait mode. For example, users have to change their viewing distances under different modes in order to perceive high-quality three-dimensional images. Briefly, the viewing distance is the distance between the user's eyes and the display screen (such as "D" illustrated in FIG. 1A). Generally, the viewing distance is in direct proportion to the eye separation as well as the distance between the parallax barrier and the pixel array. Besides, the viewing distance is in reverse proportion to the refractive index of the substrate (such as a glass substrate) as well as the pixel pitch. Accordingly, if the display is switched from the portrait mode to the landscape mode, the pixel pitches under these two modes are different which in turns result in the change of the viewing distance.

Moreover, the parallax barrier employs liquid crystal cells to form the light-shielding structure. Thus, the display, in conjunction with the liquid crystal cells of the parallax barrier, would be rotated if the user wishes to switch between the viewing modes. In this case, the liquid crystal cells in the proximity of the peripheral of the electrodes may not be rotated completely, or the distribution thereof may be uneven. As such, the user may suffer from chromatic aberration (or the color difference) due to the difference of the viewing angles.

Problems such as viewing distance or chromatic aberration may adversely affect the viewing experience of the user and the display quality of the three-dimensional image. In view of the foregoing, there exists a need in the art for providing a novel parallax barrier and method for forming three-dimensional images so as to provide users with enhanced viewing experiences.

SUMMARY

The following presents a simplified summary of the disclosure in order to provide a basic understanding to the reader.

This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one aspect, the present invention is directed to a parallax barrier. The three-dimensional image rendered by the present parallax barrier is less likely to suffer from the chromatic aberration result from the viewing angle. Also, the viewing distances under different viewing modes may be kept similar by using the present parallax barrier.

According to one embodiment of the present invention, the present parallax barrier comprises a first substrate, a second substrate, and a liquid crystal layer disposed between the first substrate and the second substrate. The first substrate has a plurality of first electrodes and a plurality of second electrodes disposed thereon. The first electrodes are strip-shaped and electrically connected to one another, and are disposed on the first substrate along a first direction. The second electrodes are also strip-shaped and electrically connected to one another, and are disposed on the first substrate along the first direction, wherein the first electrodes and the second electrodes are arranged alternately. The second substrate has a plurality of third electrodes and a plurality of forth electrodes disposed thereon. The third electrodes are electrically connected to one another and disposed on the second substrate along a second direction, wherein each of the third electrodes comprises a step-shaped first portion. The forth electrodes are also are electrically connected to one another and disposed on the second substrate along the second direction, wherein each of the forth electrodes comprises a step-shaped second portion.

In another aspect, the present invention is directed to a display device. The three-dimensional image rendered by the present display device is less likely to suffer from the chromatic aberration result from the viewing angle. Also, the viewing distances under different viewing modes may be kept similar by using the present display device.

According to one embodiment of the present invention, the display device comprises a display panel and a parallax barrier. The display panel may comprise a plurality of pixels that are arranged into a pixel array along a first direction and a second direction. Each of the pixels has a width of Wp in the first direction and a height of Hp in the second direction. More specifically, each of the pixels may comprise three sub-pixels, and each of the sub-pixels has a width of (Wp/3) in the first direction. The parallax barrier is disposed at a display face of the display panel, and the parallax barrier comprises a first substrate, a second substrate, and a liquid crystal layer disposed between the first substrate and the second substrate. The first substrate has a plurality of first electrodes and a plurality of second electrodes disposed thereon. The first electrodes are strip-shaped and electrically connected to one another, and are disposed on the first substrate along a first direction. The second electrodes are also strip-shaped and electrically connected to one another, and are disposed on the first substrate along the first direction, wherein the first electrodes and the second electrodes are arranged alternately. The second substrate has a plurality of third electrodes and a plurality of forth electrodes disposed thereon. The third electrodes are electrically connected to one another and disposed on the second substrate along a second direction, wherein each of the third electrodes comprises a step-shaped first portion. The forth electrodes are also are electrically connected to one another and disposed on the second substrate along the second direction, wherein each of the forth electrodes comprises a step-shaped second portion. More specifically, the first portion of each third electrode may comprise three first segments arranged along the second direction as step-shaped, and a step difference between any two adjacent first segments is (Wp/3) or (2 Wp/3). Similarly, the second portion of each forth electrode may comprise three second segments arranged along the second direction as step-shaped, and a step difference between any two adjacent second segments is (Wp/3) or (2 Wp/3).

In yet another aspect, the present invention is directed to a display device. The three-dimensional image rendered by the present display device is less likely to suffer from the chromatic aberration result from the viewing angle. Also, the viewing distances under different viewing modes may be kept similar by using the present display device.

According to one embodiment of the present invention, the display device comprises a display panel and a parallax barrier. The display panel is operable to render a two-dimensional image; whereas the parallax barrier is any parallax barriers according to the previous aspects and embodiments of the present invention. As such, the present parallax barrier is operable to transform the two-dimensional image rendered by the display panel into a parallax image, and the parallax image may provide a left-eye image and right-eye image to user's left and right eyes respectively, so that the user may perceive a three-dimensional image.

In still another aspect, the present invention is directed to a method for forming an autostereoscopic image.

According to one embodiment of the present invention, the method comprises the steps as follows. A two-dimensional image is rendered by using a display element. A parallax barrier according to the previous aspects and embodiments of the present invention is operated to transform the two-dimensional image into a parallax image. The parallax image is capable of providing a left-eye image and a right-eye image to a user's left and right eyes respectively so that the user perceives a three-dimensional image.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

FIG. 1A is a schematic diagram illustrating the operating principles of a conventional autostereoscopic display;

FIG. 3A is a schematic diagram illustrating the electrode arrangement on the first substrate of the parallax barrier as shown in FIG. 2;

FIG. 3B is a schematic diagram illustrating the electrode arrangement on the second substrate of the parallax barrier as shown in FIG. 2;

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1B:
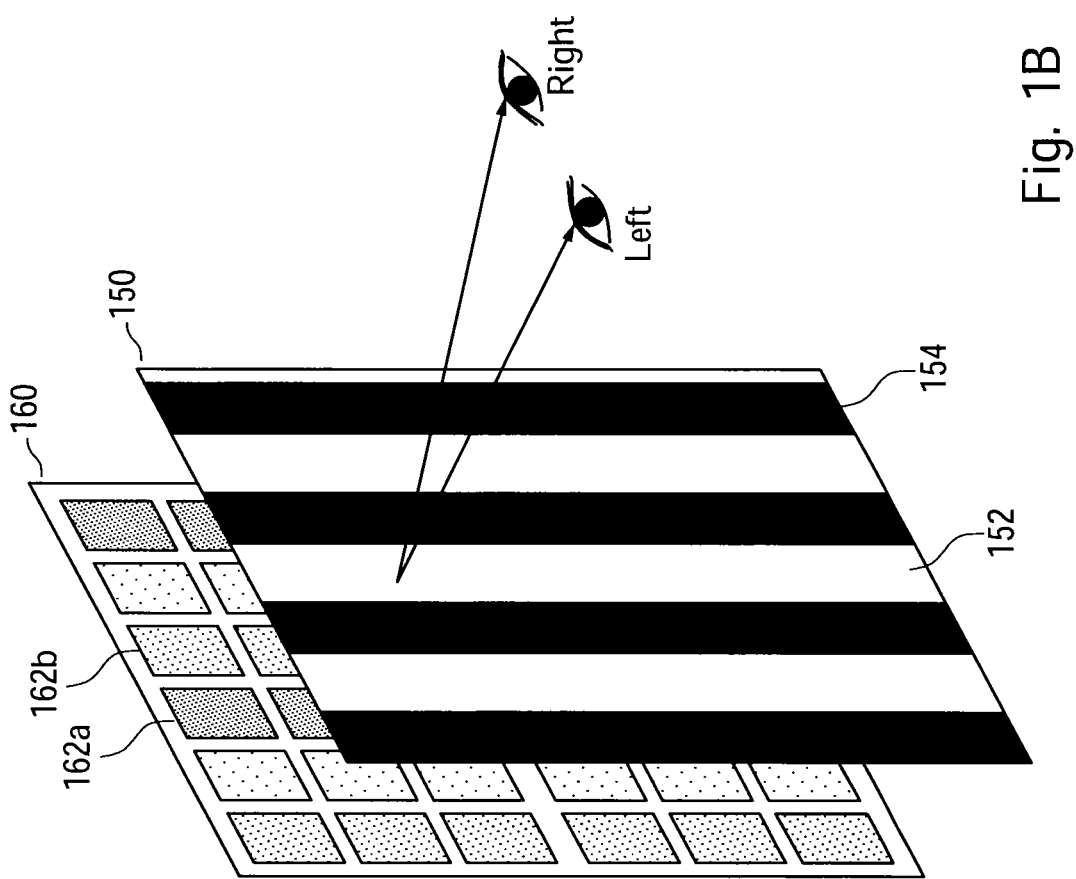
FIG. 1B is a schematic diagram illustrating a conventional autostereoscopic display that can render a parallax image under a single viewing mode.
Figure 2:
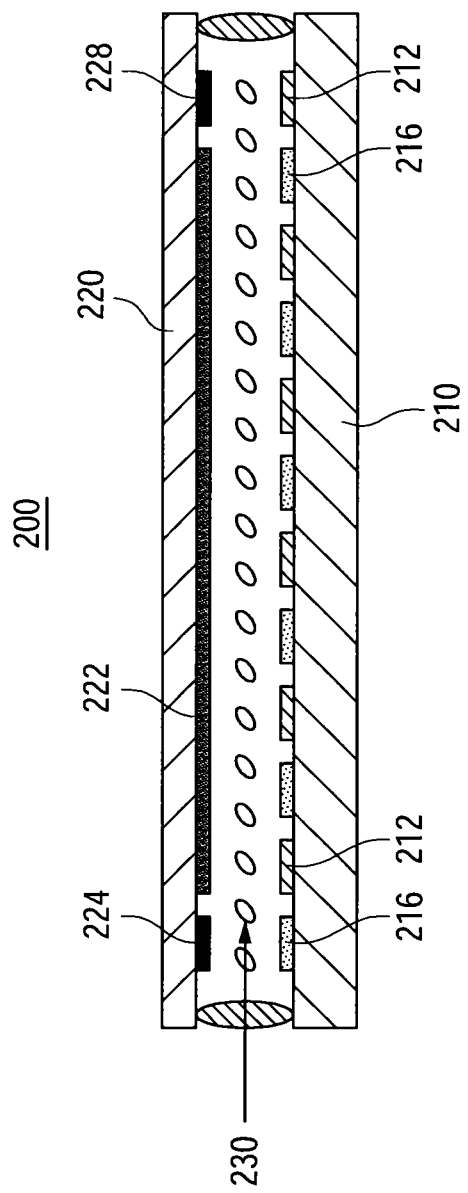
FIG. 2 is a schematic cross-section diagram illustrating a parallax barrier according to one embodiment of the present invention.

One problem faced in rendering three-dimensional images is the chromatic aberration caused by the viewing angles of the user. In addition, in conventional display device, the viewing distances under the portrait mode and the landscape mode are quite different. Aiming at solving at least the problems described above, in one aspect, the present invention is directed to a parallax barrier. Reference is now made to FIG. 2 and FIGS. 3A and 3B, which are illustrations of structures of the present parallax barrier.

FIG. 2 is a schematic diagram illustrating the parallax barrier according to one embodiment of the present invention.

As shown in FIG. 2, the parallax barrier 200 comprises a first substrate 210, a second substrate 220, a plurality of first electrodes 212 and a plurality of second electrodes 216 disposed on the first substrate 210, a plurality of third electrodes 222 and a plurality of forth electrodes 226 disposed on the second substrate 220, and a liquid crystal layer 230 disposed between the first substrate 210 and the second substrate 220.

In the present embodiment, the liquid crystal layer 230 consists of twisted nematic (TN) cells. In considering generally the conditions for carrying out this invention, the first substrate 210 and/or the second substrate 220 can be any suitable substrate; for example, the first substrate 210 and the second substrate 220 can be glass substrates. However, the present invention is not limited thereto.

FIG. 3A and FIG. 3B are respectively illustrations of the electrode arrangements on the first substrate 210 and the second substrate 220 of the parallax barrier 200 as shown in FIG. 2. As shown in FIG. 3A, the first substrate 210 has a plurality of first electrodes 212 and a plurality of second electrodes 216 disposed thereon. The first electrodes 212 are disposed on a surface of the first substrate 210 and extend along a first direction (such as, direction X illustrated in FIG. 3A). The first electrodes 212 are strip-shaped and electrically connected to one another, such as, by means of the first connecting part 214. Similarly, the second electrodes 216 are also disposed on the surface of the first substrate 210 and extend along the first direction X. The second electrodes 216 are strip-shaped and electrically connected to one another, such as, by means of the second connecting part 218. The first electrodes 212 and the second electrodes 216 are arranged alternately. Besides, the first connecting part 214 and the second connecting part 218 are disposed on the two opposite sides in the X direction on the first substrate 210.

Next, as shown in FIG. 3B, the second substrate 220 has a plurality of third electrodes 222 and a plurality of forth electrodes 226 disposed thereon. The third electrodes 222 are disposed on a surface of the second substrate 220 and extend along a second direction (such as, direction Y illustrated in FIG. 3B) that is perpendicular to the first direction X. Each of the third electrodes 222 comprises a first portion being step-shaped (as illustrated in FIG. 3B). Moreover, the third electrodes 222 are electrically connected to one another by the third connecting part 224. The forth electrodes 226 are also disposed on the surface of the second substrate 220 and extend along the second direction. Each of the forth electrodes 226 comprises a second portion being step-shaped (as illustrated in FIG. 3B). Similarly, the forth electrodes 226 are electrically connected to one another by the forth connecting part 228. The third electrodes 222 and the forth electrodes 226 are arranged alternately. Besides, the third connecting part 224 and the forth connecting part 228 are disposed on the two opposite sides in the Y direction on the second substrate 220.

Although exemplary arrangements of the first, second, third and forth electrodes are illustrated in FIG. 3A and FIG. 3B, the present invention is not limited thereto. Rather, as persons with ordinary skill in the art would recognize, there are numerous other arrangements that would be well within the scope of the present invention.

For example, in one embodiment, the phrase "the first electrodes 212 and the second electrodes 216 are arranged alternately" means that one first electrode 212 is disposed between two adjacent second electrodes 216; however, in alternative embodiments, multiple, such as two, three or more, first electrodes 212 may be disposed in two adjacent second electrodes 216. Of course, in another embodiment, one second electrode 216 is disposed between two adjacent first electrodes 212; in alternative embodiments, multiple, such as two, three or more, second electrodes 216 may be disposed between two adjacent first electrodes 212.

Similarly, in one embodiment, the phrase "the third electrodes 222 and the forth electrodes 226 are arranged alternately" means that one third electrode 222 is disposed between two adjacent forth electrodes 226; in alternative embodiments, multiple, such as two, three or more, third electrodes 222 are disposed between two adjacent forth electrodes 226. In another embodiment, one forth electrode 226 is disposed between two adjacent third electrodes 222; in alternative embodiments, multiple, such as two, three or more, forth electrodes 226 are disposed between two adjacent third electrodes 222.

In theory, the gap between any two adjacent electrodes should be as narrow as possible so that the parallax barrier 200 may exhibit a better parallax effect. Therefore, according to optional embodiments of the present invention, the gap between the adjacent first electrode 212 and second electrode 216 is smaller than or equal to 6 µm. Similarly, optional embodiments of the present invention, the gap between the adjacent third electrode 222 and forth electrode 226 is smaller than or equal to 6 µm.

According to various embodiments of the present invention, the first electrodes 212, the second electrodes 216, the third electrodes 222, and the forth electrodes 226 may be made of a transparent conducive material, respectively. Illustrative examples of the transparent conducive material, include, but are not limited to: indium tin oxide (ITO), indium zinc oxide (IZO), fluorine doped tin oxide (FTO), aluminum zinc oxide (AZO), gallium zinc oxide (GZO), zinc oxide (ZnO), tin dioxide ($SnO_2$) and the combinations of the above-mentioned materials. As an example, rather than a limitation, the electrodes may be transparent conductive layers made of ITO. In one preferred embodiment, the material of the first, second, third and the forth connecting parts 214, 218, 224, and 228 can be the same as that of the first, second, third and forth electrodes 212, 216, 222, and 226.

In one alternative embodiment, any one set or any one electrode of the first, second, third and forth electrodes 212, 216, 222, and 226 may optionally comprises a plurality of transparent conductive patterns and at least one bridging pattern. Examples of such electrode design are illustrated in FIG. 4A and FIG. 4B.

Figure 4A:
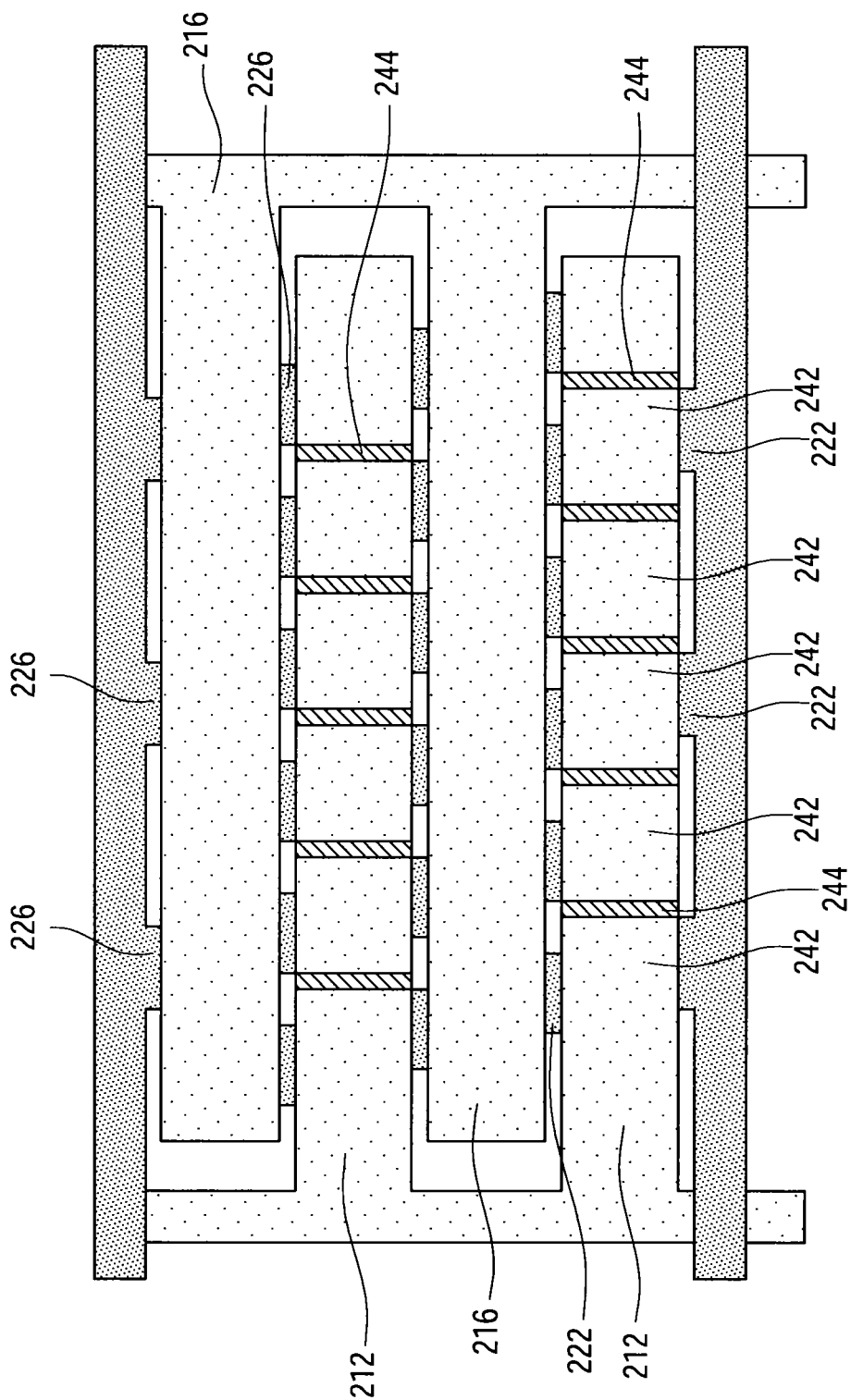
FIG. 4A is an exemplary electrodes layout according to one embodiment of the present invention.
Figure 4B:
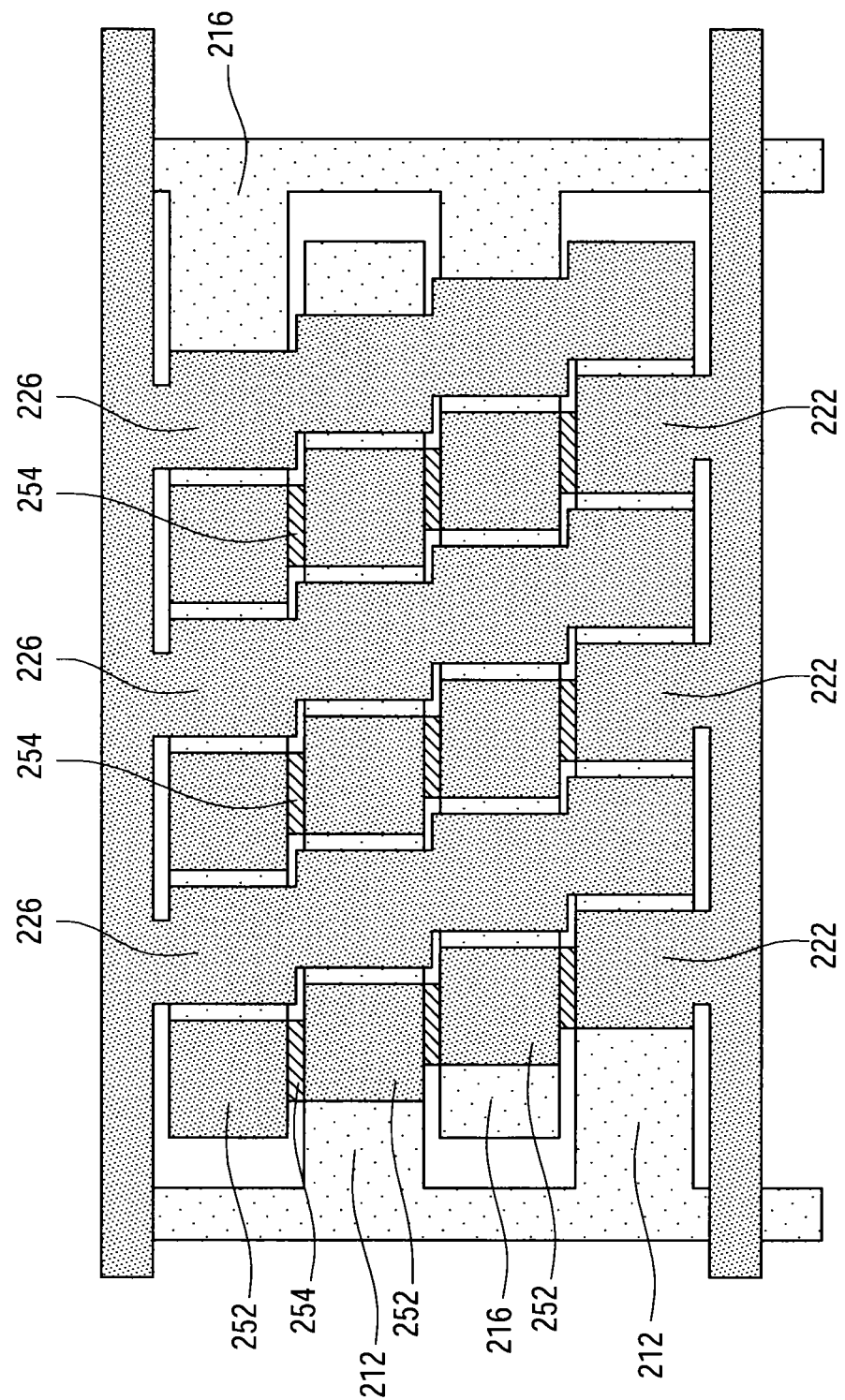
FIG. 4B is an exemplary electrodes layout according to another embodiment of the present invention.

FIG. 4A and FIG. 4B are illustrations of two exemplary electrodes layouts according to embodiments of the present invention. For the sake of brevity, only the layouts of the first electrodes 212, the second electrodes 216, the third electrodes 222, and the forth electrodes 226 are illustrated, whereas the other portions (such as those illustrated in FIG. 2) of the parallax barrier are omitted.

As shown in FIG. 4A, each of the first electrodes 212 may comprise a plurality of transparent conductive pattern 242 and at least one opaque bridging pattern 244. More specifically, the transparent conductive pattern 242 are separated from each other, and each bridging pattern 244 bridges between two adjacent transparent conductive patterns 242, so that the adjacent transparent conductive patterns 242 are electrically connected to each other. Besides, the bridging pattern 244 is disposed above the gap between the adjacent third electrodes 222 and forth electrodes 226.

As described hereinabove, a plurality of first electrodes 212 are disposed on the first substrate 210, and the electrode design where the transparent conductive patterns are bridged (connected) by bridging pattern(s) can be applied in all or a portion of the first electrodes 212. Besides, although the first electrodes 212 are taken as an example in FIG. 4A to illustrate such electrode design, the present invention is not limited thereto. Rather, such electrode design may be applied to the second electrodes 216, or alternatively, to both the first electrodes 212 and the second electrodes 216.

An electrode design of the third electrodes 222 is illustrated in FIG. 4B. As shown in FIG. 4B, each of the third electrodes 222 may comprise a plurality of transparent conductive pattern 252 and at least one opaque bridging pattern 254. More specifically, the transparent conductive pattern 252 are separated from each other, and each opaque bridging pattern 254 bridges between two adjacent transparent conductive patterns 252, so that the adjacent transparent conductive patterns 252 are electrically connected to each other. Besides, the bridging pattern 254 is disposed above the gap between the adjacent first electrodes 212 and second electrodes 216.

As described hereinabove, a plurality of third electrodes 222 are disposed on the second substrate 220, and the electrode design where the transparent conductive patterns are bridged (connected) by bridging pattern(s) can be applied in all or a portion of the third electrodes 222. Besides, it should be noticed that the third electrodes 222 comprises a plurality of non-rectangular segments each consisting of a transparent conductive pattern 252 and an opaque bridging pattern 254, whereas the forth electrodes 226 comprises a plurality of rectangular segments, as shown in FIG. 4B.

Although the third electrodes 222 are taken as an example in FIG. 4B to illustrate such electrode design, the present invention is not limited thereto. Rather, such electrode design may be applied to the forth electrodes 226, or alternatively, to both the third electrodes 222 and the forth electrodes 226. In one optional embodiment, the electrodes designs illustrated in FIG. 4A and FIG. 4B can be applied to the first electrodes 212 and second electrodes 216, and the third electrodes 222 and the forth electrodes 226, respectively.

In one optional embodiment, the opaque bridging patterns 244 and 254 may be made of an opaque metal material, respectively. As an example, rather than a limitation, metal materials suitable for use herein can be any one of the followings: silver, gold, copper, palladium, chromium, platinum, molybdenum, titanium, tantalum, tungsten, aluminum, iron, cobalt, zinc, tin, nickel, and an alloy or a combination of the foregoing materials.

In manufacturing the electrodes as shown in FIG. 4A or FIG. 4B, a plurality of transparent conductive patterns that are separated from each other and bridging pattern(s) made of an opaque metal material are formed separately.

Figure 4C:
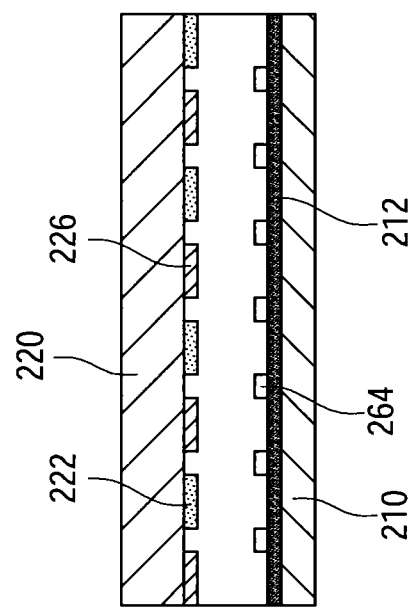
FIG. 4C is an exemplary electrodes layout according to yet another embodiment of the present invention.

Alternatively, in another manufacturing process, continuous transparent conductive electrodes are formed first, and then, an opaque metal layer is formed on the specified positions to serve as the bridging patterns. For example, as illustrated in the parallax barrier of FIG. 4C, a plurality of first electrodes 212 and a plurality of second electrodes (not shown) are formed on a surface of the first substrate 210, wherein each of the first electrodes 212 is a continuous transparent conductive electrode, and opaque bridging patterns 264 are formed on a surface of the first electrode 212. As shown in FIG. 4C, each of the opaque bridging patterns 264 is disposed at the overlap between the first electrode 212 and a gap between the two adjacent third electrode 222 and forth electrode 226.

In one optional embodiment, a black matrix layer (not shown) may be disposed on the first substrate 210 or the second substrate 220, so as to shield the gaps between the third electrodes 222 and the forth electrodes 226 on the second substrate 220. Alternatively, in another optional embodiment, a black matrix layer (not shown) may be disposed on the first substrate 210 or the second substrate 220, so as to shield the gaps between the first electrodes 212 and the second electrodes 216 on the first substrate 210. Alternatively, in still another optional embodiment, a black matrix layer may be disposed on the first substrate 210 or the second substrate 220, so as to shield the gaps between the first electrodes 212 and the second electrodes 216 and the gaps between the third electrodes 222 and the forth electrodes 226 at the same time.

In one optional embodiment, the third electrodes 222 may further comprise a step-shaped third portion (not shown) in addition to the first portion. Alternatively, the forth electrodes 226 may further comprise a step-shaped forth portion (not shown) in addition to the second portion.

In another aspect, the present invention is directed to a display device. The three-dimensional image rendered by the present display device is less likely to suffer from the chromatic aberration result from the viewing angle. Also, the viewing distances under different viewing modes may be kept similar by using the present display device.

According to one embodiment of the present invention, the display device comprises a display panel and a parallax barrier according to the above-mentioned aspect/embodiments of present invention (such as, parallax barrier 200). The parallax barrier is disposed at a side of the display panel (such as, a display face or a light-incident face of a display panel). Briefly, a display panel comprises a plurality of pixels, and the arrangements of the electrodes of the parallax barrier can be designed based on the arrangement of these pixels.

In implantation, the display panel may comprise any display panel capable of rendering a two-dimensional image. Illustrative examples of such display panel include, but are not limited to: a liquid crystal display unit, an electroluminescent display unit and an electrophoretic display unit.

Figure 5A:
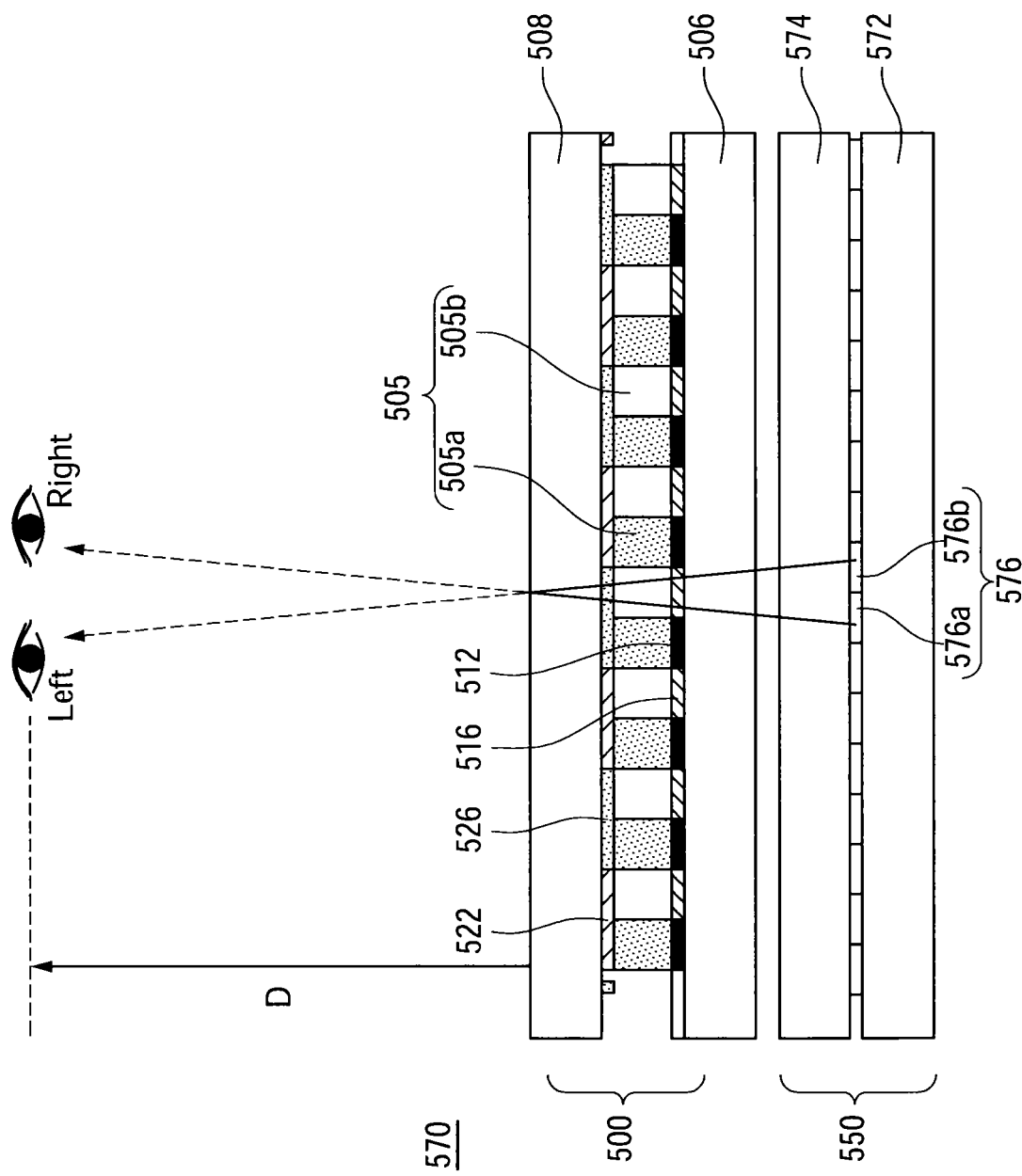
FIG. 5A is a schematic cross-section diagram illustrating a display device according to one embodiment of the present invention.

A display device 570 according to one embodiment of the present invention is depicted in FIG. 5A. The display device 570 comprises a display panel 550 and a parallax barrier 500. Take FIG. 5A as an example, the display panel 550 is a liquid crystal display unit which comprises a pair of substrates 572 and 574 and a liquid crystal layer 576 sandwiched therebetween. The liquid crystal layer 576 comprises a plurality of liquid crystal cells, and each of the liquid crystal cells is corresponding to the pixel arrangement (that is the pixel arrangement 560 as illustrated in FIG. 5C) disposed on the substrate 576. It should be noted that, for the sake of simplicity and clarity of the drawing, the gap between the first electrodes 512 and the second electrodes 516, as well as the gap between the third electrodes 522 and the forth electrodes 526, are not shown in FIG. 5A.

As can be appreciated by persons with ordinary skill in the art, the display panel 550 may further comprise a polarizer (not shown). The polarizer may be disposed on a surface of the substrate 572 and/or a surface of the substrate 574. In addition, the display panel 550 may further comprise a light source, such as a backlight module (not shown) disposed at a light-incident face of the display panel 550 (such as, under the substrate 572). Moreover, the display panel 550 may comprise a color filter (not shown) so that the display panel 550 may render a color two-dimensional image. The materials and constructions for manufacturing the liquid crystal display unit, including that of the polarizer, color filter and/or backlight module, are well known to those with ordinary skill in the art, and hence, are not discussed in detailed herein.

Besides, although both of the parallax barrier 500 and the display panel 550 are depicted to have two substrates in FIG. 5A, it is possible to omit one of the two substrates in optional embodiments. For example, the first substrate 506 of the parallax barrier 500 may be omitted, and the substrate 574 can be shared by the parallax barrier 500 and the display panel 550. Alternatively, the second substrate 574 of the display panel 550 may be omitted, and the substrate 506 can be shared by the parallax barrier 500 and the display panel 550.

The structures and operating principles of the display device 570 under different viewing modes are discussed hereinabove in connection with FIGS. 5A to 5D and FIGS. 6A to 6D.

Figure 5B:
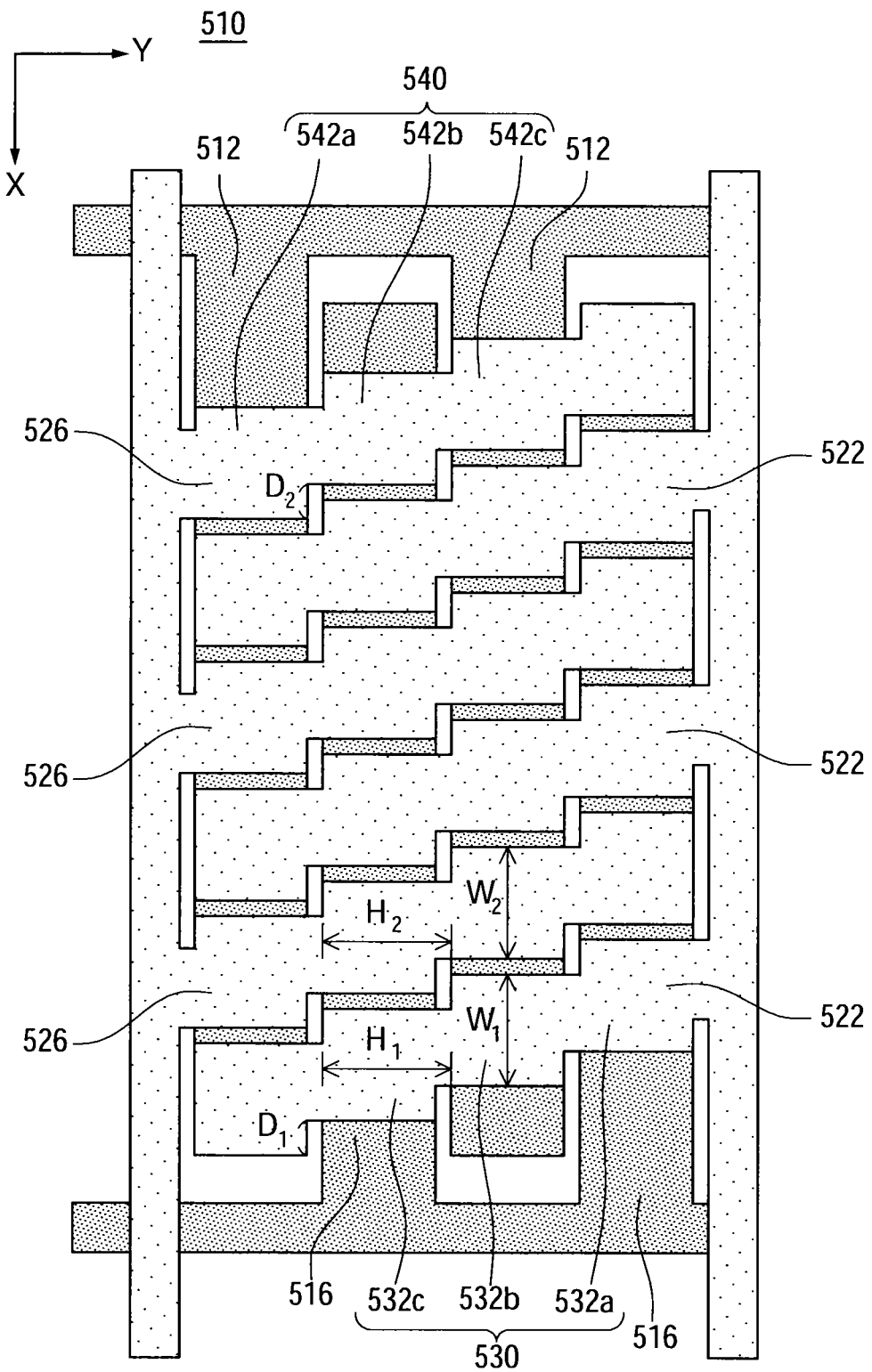
FIG. 5B is a schematic diagram illustrating the electrode arrangements on the first substrate and the second substrate of the parallax barrier of the display device as shown in FIG. 5A under the first mode.
Figure 5C:
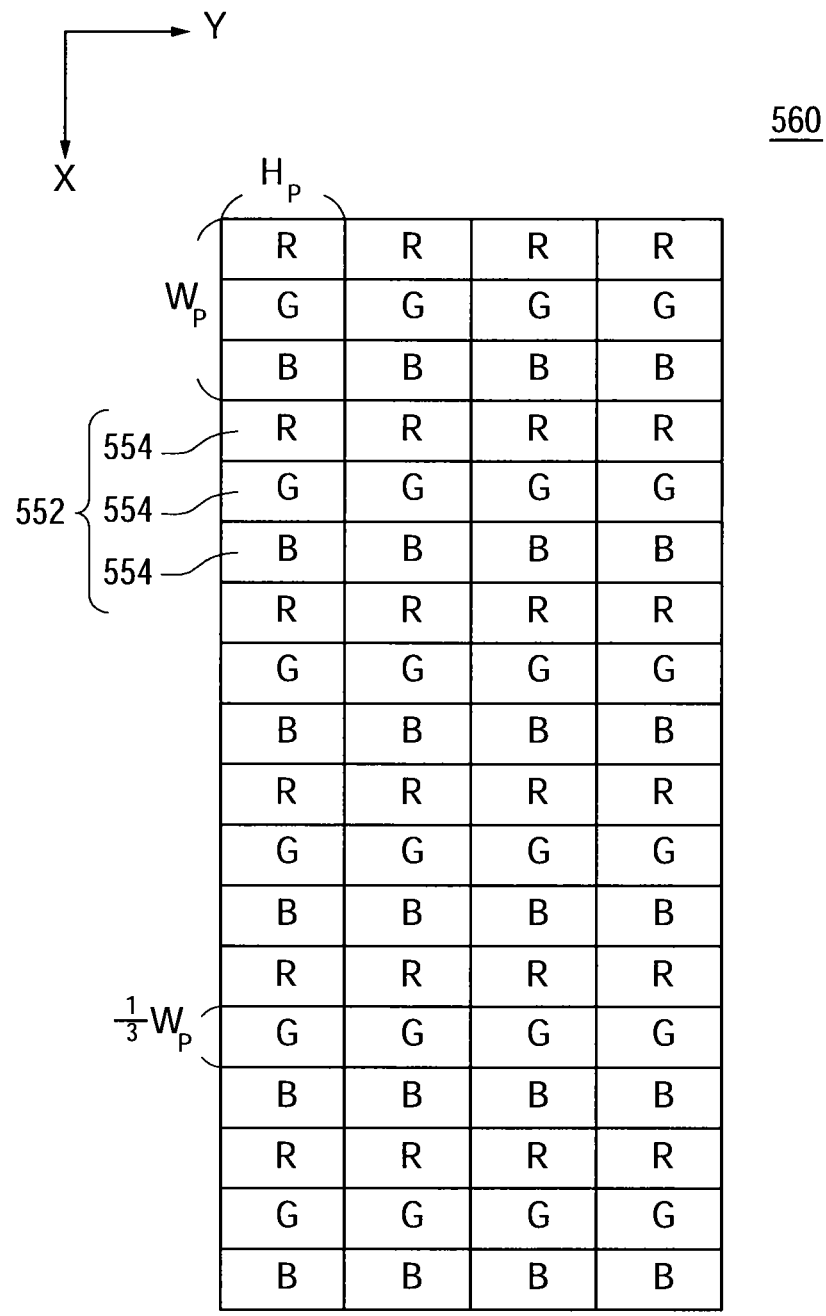
FIG. 5C is a schematic diagram illustrating the pixel arrangement of the display panel of the display device as shown in FIG. 5A under the first mode.

The electrode arrangement 510 of the parallax barrier 500 and pixel arrangement 560 of the display panel 550 under the first mode (for example, the portrait mode) are depicted in FIG. 5B and FIG. 5C respectively.

Reference is made to FIG. 5A and FIG. 5B. As shown in the figures, the parallax barrier 500 is similar to the parallax barrier 200 and comprises a first substrate 506, a second substrate 508, a liquid crystal layer 505 disposed between the first substrate 506 and the second substrate 508, a plurality of first electrodes 512 and a plurality of second electrodes 516 disposed on the first substrate 506, and a plurality of third electrodes 522 and a plurality of forth electrodes 526 disposed on the second substrate 508.

For the sake of simplicity and clarity, only the layouts of the electrodes on the first substrate 506 and the second substrate 508 are depicted in FIG. 5B. The electrodes layout on the first substrate as shown in FIG. 5B is similar to that as depicted in FIG. 3A, wherein the plurality of first electrodes 512 and the plurality of second electrodes 516 are disposed on the first substrate (not shown in FIG. 5B). The first electrodes 512 are disposed on a surface of the first substrate and extend along a first direction X, and the first electrodes 512 are strip-shaped and electrically connected to one another. Similarly, the second electrodes 516 are also disposed on the first substrate and extend along the first direction X, and the second electrodes 516 are strip-shaped and electrically connected to one another. The first electrodes 512 and the second electrodes 516 are arranged alternately.

As shown in FIG. 5C, the display panel 550 may comprise a plurality of pixels 552 that are arranged into a pixel array along the first direction X and the second direction Y. Each pixel 552 has a width of Wp in the first direction X and a height of Hp in the second direction Y. More specifically, each pixel 552 may comprise three sub-pixels 554, and each sub-pixel 554 has a width of (Wp/3) in the first direction X and a height of Hp in the second direction Y.

Returning back to FIG. 5B, the electrodes layout on the second substrate as shown in FIG. 5B is similar to that as depicted in FIG. 3B, wherein a plurality of third electrodes 522 and a plurality of forth electrodes 526 are disposed on the second substrate (not shown in FIG. 5B) of the parallax barrier 500. The third electrodes 522 are disposed on a surface of the second substrate and extend along a second direction Y that is perpendicular to the first direction X. The third electrodes 522 are electrically connected to one another, and each of the third electrodes 522 comprises a step-shaped first portion 530. The forth electrodes 526 are also disposed on the second substrate and extend along the second direction Y. Similarly, the forth electrodes 526 are electrically connected to one another, and each of the forth electrodes 526 comprises a step-shaped second portion 540. The third electrodes 522 and the forth electrodes 526 are arranged alternately.

More specifically, the first portion 530 of each third electrode 522 may comprise three first segments 532a, 532b, and 532c disposed along the second direction Y. The first segments 532a, 532b, and 532c are arranged in step-shape; wherein a step difference $D_1$ between any two adjacent first segments (such as 532a and 532b) is (Wp/3) or (2 Wp/3). In other words, the step difference $D_1$ between any two adjacent first segments in the X direction is substantially the same as the width of one or two sub-pixels in the first direction X.

Similarly, the second portion 540 of each forth electrode 526 may comprise three second segments 542a, 542b, and 542c disposed along the second direction Y. The second segments 542a, 542b, and 542c are arranged in step-shape; wherein a step difference $D_2$ between any two adjacent second segments (such as 542b and 542c) is (Wp/3) or (2 Wp/3). In other words, the step difference $D_2$ between any two adjacent second segments in the X direction is substantially the same as the width of one or two sub-pixels in the first direction X.

As can be appreciated by persons with ordinary skill in the art, each of the first electrodes 512, second electrodes 516, third electrodes 522, and forth electrodes 526 described herein may be similar to the respective first electrodes 212, second electrodes 216, third electrodes 222, and forth electrodes 226 in structure and design. Hence, the descriptions provided hereinabove in connection with the first, second, third and forth electrodes 212, 216, 222 and 226 are applicable to the first, second, third and forth electrodes 512, 516, 522 and 526 described in the present embodiment.

For example, the first electrodes 512 and the second electrodes 516 of the parallax barrier 500 may have a gap therebetween. Alternatively, the third electrodes 522 and the forth electrodes 526 may have a gap therebetween.

Besides, each of the first, second, third and forth electrodes 512, 516, 522 and 526 of the parallax barrier 500 may be made of a transparent conductive layer, respectively. Alternatively, the first, second, third and forth electrodes 512, 516, 522 and 526 may each have a structure described hereinabove in connection with FIG. 4A, FIG. 4B or FIG. 4C. More specifically, in one optional embodiment, each of the electrodes may have a plurality of transparent conductive patterns separated from each other and at least one opaque bridging pattern bridging between the transparent conductive patterns. In an alternative embodiment, each of the electrodes may comprise at least one opaque bridging pattern which is disposed at the overlap between the third electrode and a gap between the adjacent first electrode and second electrode or the overlap between the first electrode and a gap between the adjacent third electrode and forth electrode. Similarly, the opaque bridging pattern may be made of a material comprising the opaque metal described hereinabove.

Moreover, the parallax barrier 500 may further comprise a black matrix layer as described hereinabove. The black matrix layer may be disposed on either of the first substrate 506 and the second substrate 508 so as to shield the gap(s) between the third electrodes 522 and the forth electrodes 526 on the second substrate 508. Alternatively, the black matrix layer may be disposed on either of the first substrate 506 and the second substrate 508 so as to shield the gap(s) between the first electrodes 512 and the second electrodes 516 on the first substrate 506. Still alternatively, in one optional embodiment, the black matrix layer may be disposed on either of the first substrate 506 and the second substrate 508 so as to shield the gap(s) between the first electrodes 512 and the second electrodes 516 and the gaps between the third electrodes 522 and the forth electrodes 526 at the same time.

As used in the present specification, each of the first segments 532a, 532b, and 532c has a segment height of $H_1$ in the second direction Y and a segment width of $W_1$ in the first direction X, as depicted in FIG. 5B. Also, each of the second segments 542a, 542b, and 542c has a segment height of $H_2$ in the second direction Y and a segment width of $W_2$ in the first direction X, as depicted in FIG. 5B.

In one embodiment, the segment width $W_1$ is less than the width Wp of each pixel 552, and the segment width $W_2$ is also less than the width Wp of each pixel 552. In another embodiment, the segment width $W_1$ is equal to the width Wp of each pixel 552, and the segment width $W_2$ is less than the width Wp of each pixel 552. In one embodiment, the segment height $H_1$ or $H_2$ is substantially equal to the height Hp of each pixel 552.

In optional embodiments, the height of each first electrode 512 and each second electrode 516 in the second direction Y is less than the height Hp of each pixel 552.

Reference is now made to FIGS. 5A to 5D, under the first viewing mode; the steps for operating the parallax barrier 500 so that the display device 570 may render an autostereoscopic image are as follows.

Figure 5D:
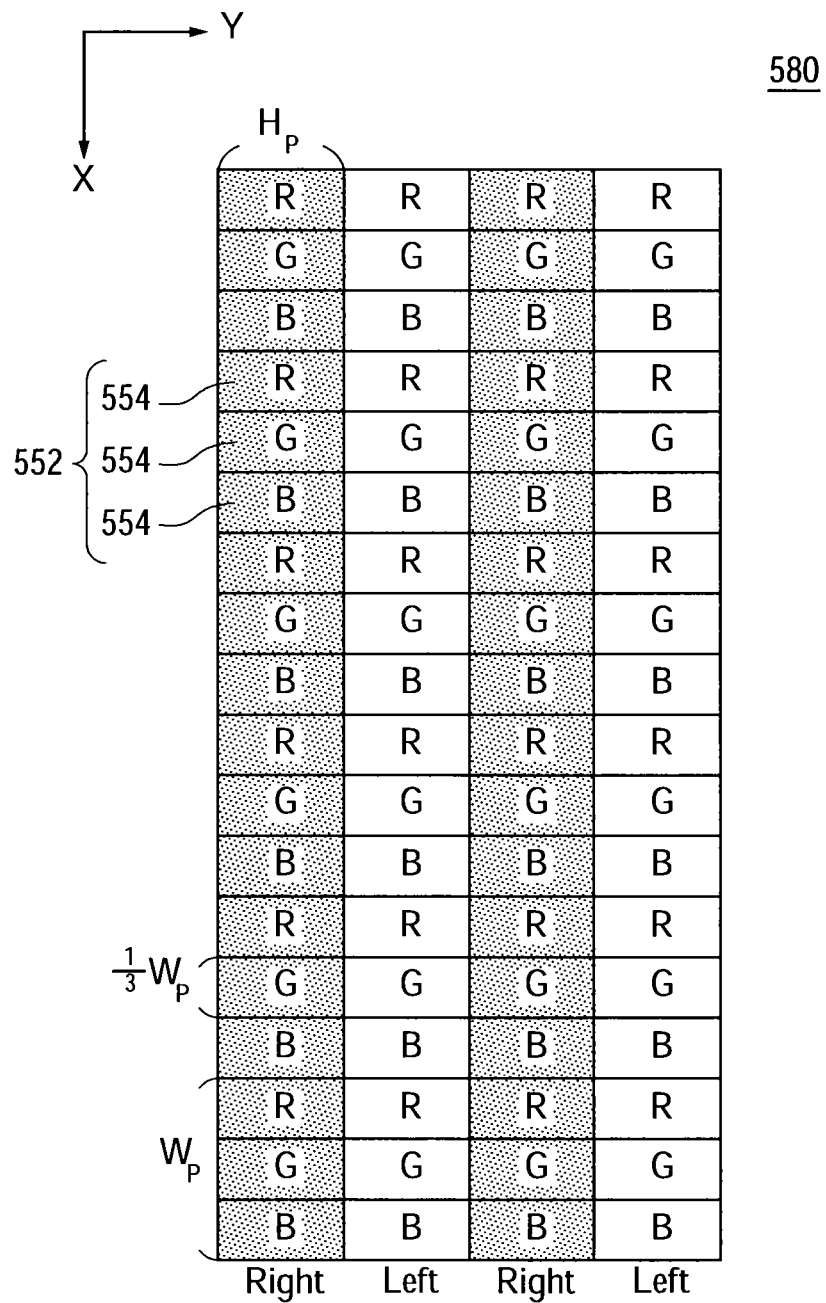
FIG. 5D is a schematic diagram illustrating the parallax structure formed, under the first mode, by the electrode arrangements of FIG. 5B and pixel arrangement of FIG. 5C.

A reference voltage (usually a ground voltage) is applied to the second electrodes 516, the third electrodes 522, and the forth electrodes 526, while a data voltage (usually a voltage different from the ground voltage) is applied to the first electrodes 512. In this case, the electric filed formed by the first electrodes 512 may drive the liquid crystal cells 505a (i.e., the cells that are disposed at positions corresponding to the first electrodes 512), and hence, the light cannot pass through these portions. In contrast, liquid crystal cells 505b disposed at the other portions (such as those being disposed at positions corresponding to the second electrodes 516) are not driven, thereby allowing light to pass therethrough. As such, under the first mode, a parallax structure 580 (as shown in FIG. 5D) may be formed by the cooperation of the parallax barrier 500 and the pixel arrangement 560 (as shown in FIG. 5C) of the display panel 550. Hence, under the first mode, when a two-dimensional image rendered by the display panel 550 passes through the parallax barrier 500, the parallax structure 580 is able to transform the two-dimensional image into a parallax image. Specifically, the parallax image is an image that comprises a left-eye image (rendering by the pixels labeled with "Left" in FIG. 5D) and a right-eye image (rendering by the pixels labeled with "Right" in FIG. 5D), and when a user's left and right eyes receive the left-eye image and right-eye image respectively, the user's brain is able to perceive a three-dimensional image. More specifically, the liquid crystal cells 576a shown in FIG. 5A are corresponding to the right-eye pixels depicted in FIG. 5C, whereas the liquid crystal cells 576b shown in FIG. 5A are corresponding to the left-eye pixels depicted in FIG. 5C. As such, the user's brain may perceive a three-dimensional image as illustrated in FIG. 5A.

Figure 6A:
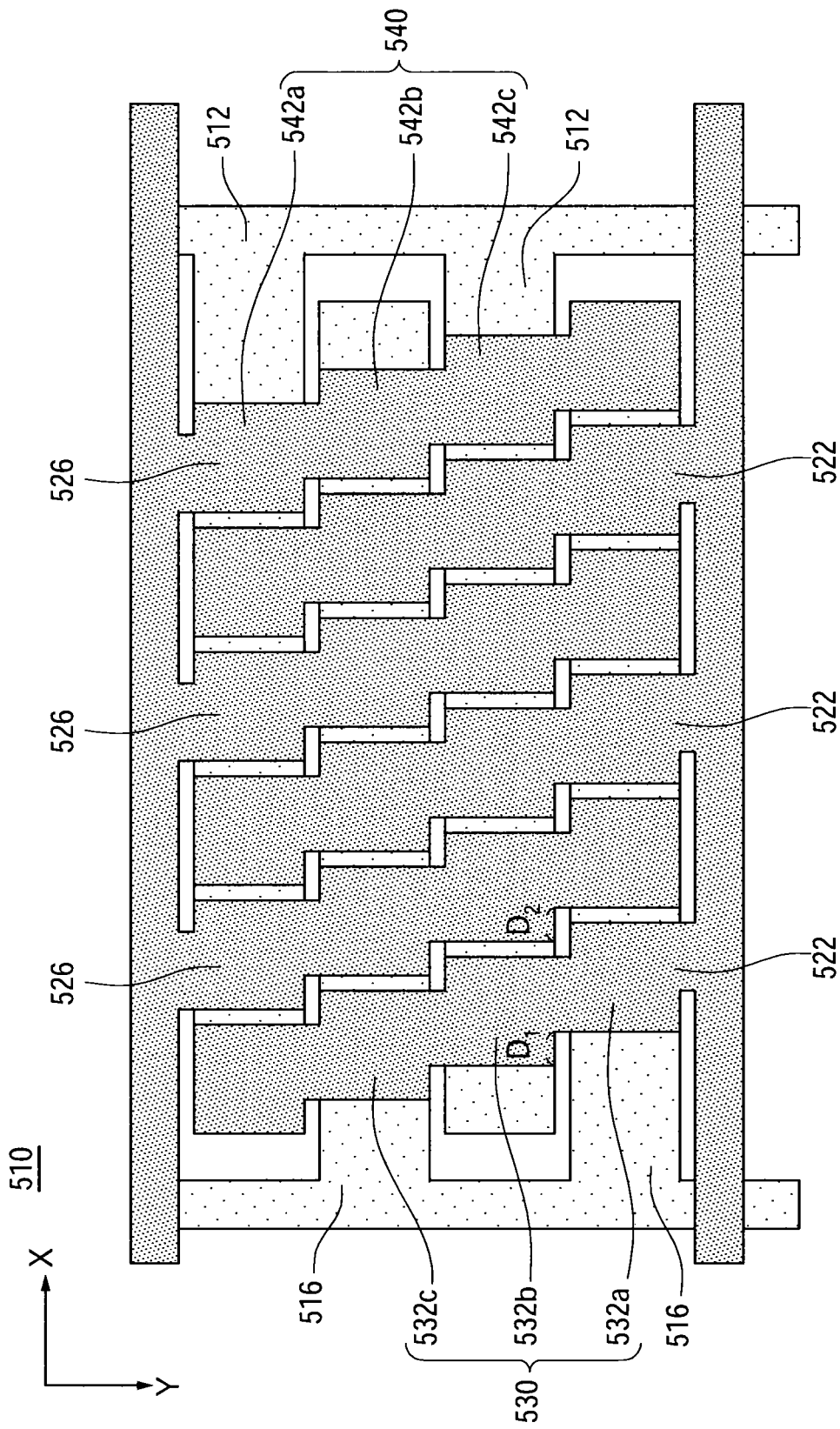
FIG. 6A is a schematic diagram illustrating the electrode arrangements on the first substrate and the second substrate of the parallax barrier of the display device as shown in FIG. 5A under the second mode.
Figure 6B:
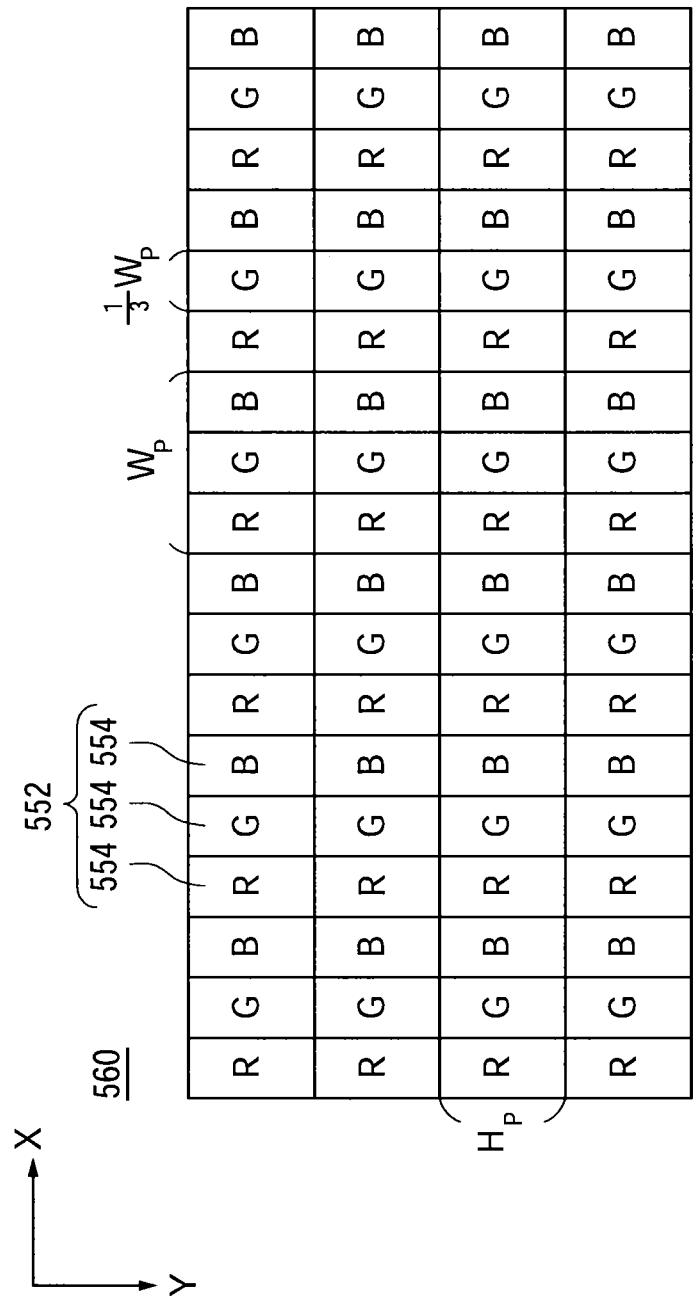
FIG. 6B is a schematic diagram illustrating the pixel arrangement of the display panel of the display device as shown in FIG. 5A under the second mode.

Next, reference is made to FIG. 6A and FIG. 6B which are illustrations of the electrode arrangement 510 of the parallax barrier 500 and the pixel arrangement 560 of the display panel 550 under the second mode (such as, the landscape mode). In fact, the structures depicted in FIG. 6A and FIG. 6B are the same as FIG. 5B and FIG. 5C, except that the drawings are rotated by 90 degrees clockwise.

Under the second viewing mode, the steps for operating the parallax barrier 500 so that the display device 570 may render an autostereoscopic image are as follows.

Figure 6C:
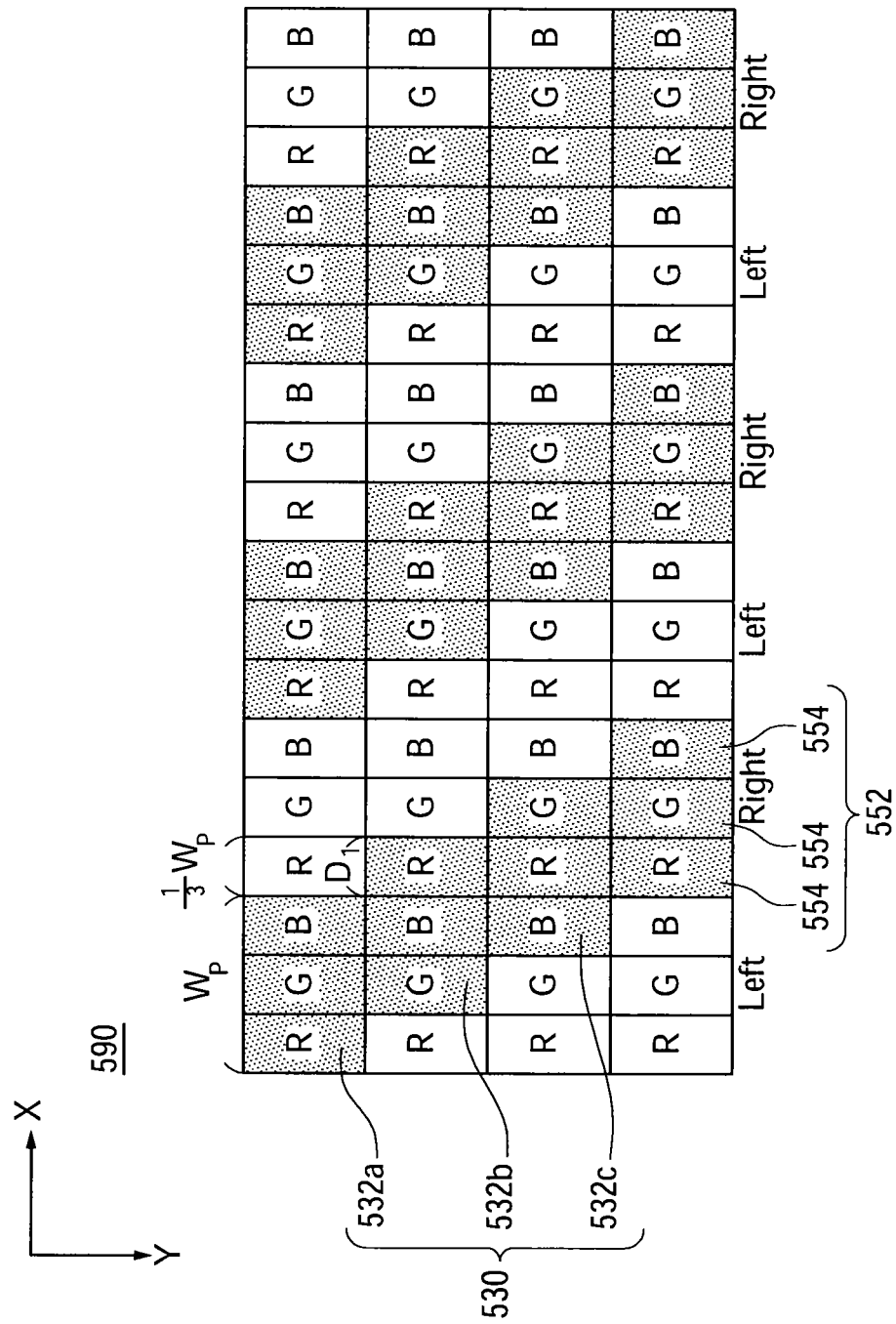
FIG. 6C is a schematic diagram illustrating the parallax structure formed, under the second mode, by the electrode arrangements of FIG. 6A and pixel arrangement of FIG. 6B.

A reference voltage (usually a ground voltage) is applied to the first electrodes 512, the second electrodes 516 and the forth electrodes 526, while a data voltage (usually a voltage higher than the ground voltage) is applied to the third electrodes 522. In this case, the electric filed formed by the third electrodes 522 may drive the liquid crystal cells 505c (i.e., the cells that are disposed at positions corresponding to the second electrodes 522), and hence, the light cannot pass through these portions. In contrast, liquid crystal cells 505d disposed at the other portions (such as those being disposed at positions corresponding to the forth electrodes 526) are not driven, thereby allowing light to pass therethrough. As such, under the second mode, a parallax structure 590 (as shown in FIG. 6C) may be formed by the cooperation of the parallax barrier 500 and the pixel arrangement 560 (as shown in FIG. 6B) of the display panel 550. Hence, under the second mode, when a two-dimensional image rendered by the display panel 550 passes through the parallax barrier 500, the parallax structure 590 is able to transform the two-dimensional image into a parallax image that is capable of providing a left-eye image (rendering by the pixels labeled with "Left" in FIG. 6C) and a right-eye image (rendering by the pixels labeled with "Right" in FIG. 6C) to a user's left and right eyes, respectively, so that the user's brain is able to perceive a three-dimensional image.

Figure 6D:
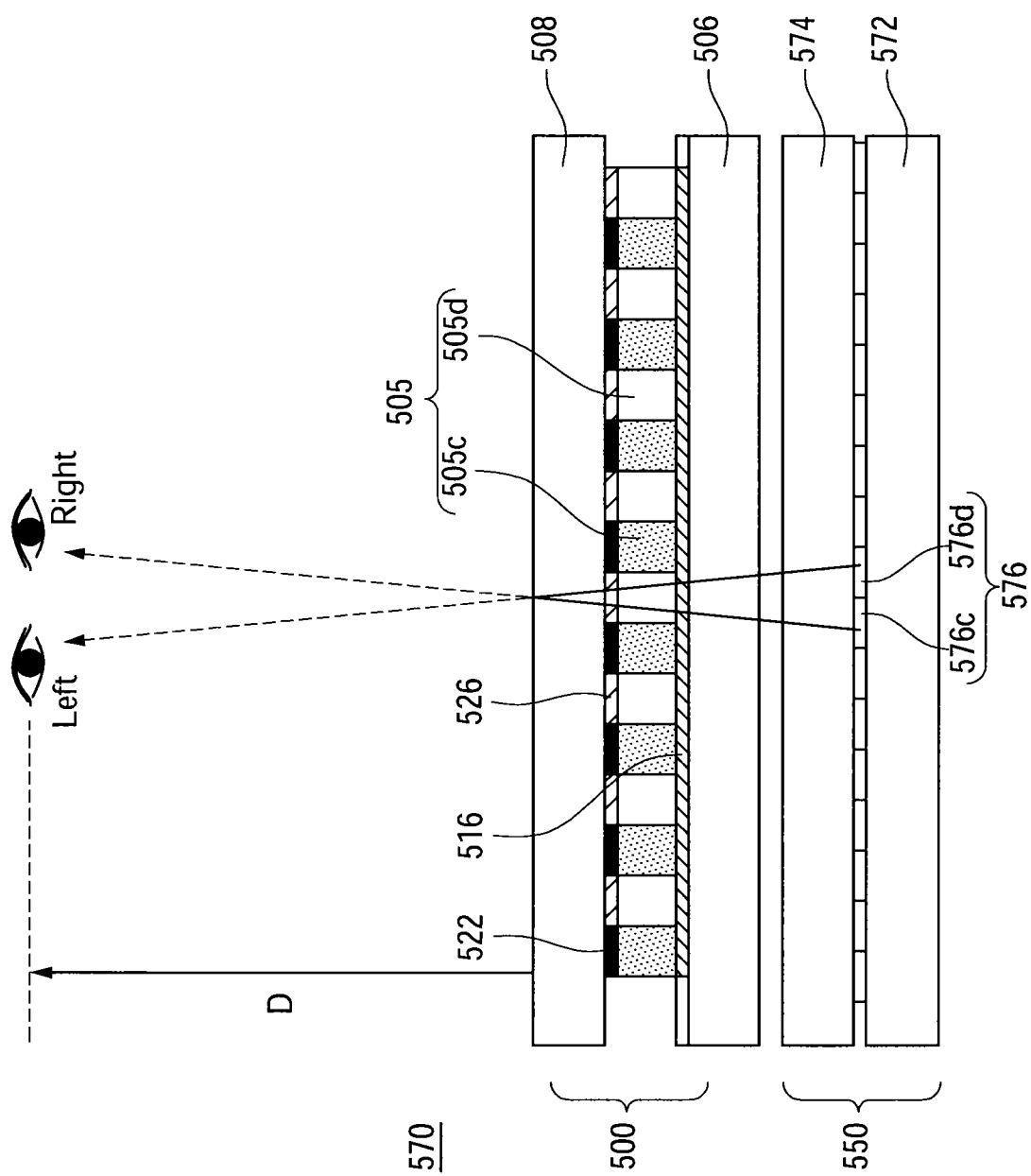
FIG. 6D is a schematic diagram illustrating the principles for forming a three-dimensional image under the second mode according to the display device as shown in FIGS. 6A to 6C.

Next, please refer to FIG. 6D which is a schematic illustration of the three-dimensional image formed by the display device 570 under the second mode. For the sake of the simplicity and clarity, the gaps between the third electrodes 522 and the forth electrodes 526 are not depicted in FIG. 6D.

As shown in FIG. 6D, the liquid crystal cells 576c are corresponding to the right-eye pixels depicted in FIG. 6C, whereas the liquid crystal cells 576d are corresponding to the left-eye pixels depicted in FIG. 6C. As such, the user's brain may perceive a three-dimensional image as illustrated in FIG. 6D.

As described hereinabove, rotated to switch between the two viewing modes, the display device should be rotated, and so do the liquid crystal cells disposed therein. Conventionally, if the liquid crystal cells in the proximity of the peripheral of the electrodes are not rotated completely, or if the distribution of these liquid crystal cells is uneven, the display device may exhibit severe chromatic aberration. However, the step-shaped electrodes employed in the parallax barrier of the present invention (such as parallax barrier 200 or 500) may address such issue properly.

Please refer to FIGS. 6A-6C, in the first direction X, the step $D_1$ between any two adjacent first segments (532a, 532b, and 532c) of each third electrode 522 is (Wp/3), and the width of each sub-pixel 554 of each pixel 552 is also (Wp/3). Therefore, by tying the present electrode arrangement with the present pixel arrangement, the first sub-pixels in the X direction of the pixel corresponding to each of the three first segments 532a, 532b, and 532c of the first portion 530 is R, G and B, respectively, as shown in FIG. 6C. In other words, the sub-pixels at the peripheral of the first portion 530 of the third electrodes 522 are not the same kind of sub-pixels. As such, even if the liquid crystal cells in the proximity of the peripheral of the electrodes are not rotated completely, or if the distribution of these liquid crystal cells is uneven, the chromatic aberration caused by the viewing angles can be improved, because all of the three kinds of sub-pixels (R, G, and B) may suffer from the above-identified problem, and the chromatic aberrations caused by each kind of sub-pixels may offset one another.

Moreover, the arrangement of the step-shaped electrodes is designed based on the pixel arrangement in such a way that the pixel pitches of the display panel under both the first mode (such as, the portrait mode) and the second mode (such as, the landscape mode) are substantially the same. Accordingly, when a user switches between different viewing modes, he or she does not have to alter the viewing distance substantially in order to view clear three-dimensional images.

Although the first segments 532a, 532b, and 532c are depicted to have a step $D_1$ of (Wp/3), as illustrated in FIG. 5B and FIG. 6A, the present invention is not limited to such electrode arrangement. Rather, as will be apparent to one of ordinary skill in the art after reading the present specification, numerous alternative architectures can be used to implant the electrode arrangement according to the present invention.

For example, some exemplary electrode arrangements are illustrated in FIG. 7A to FIG. 7E, all of which is suitable to use with the pixel arrangement illustrated in FIG. 6B. To facilitate the understanding of these drawings and the following discussions, the direction denoted by full-line arrow X is referred to as the right side, and the direction denoted by full-line arrow Y is referred to as the lower side. Besides, only the sub-pixels that are corresponding to the third electrodes are denoted with R, G, or B in the drawings, whereas the other pixels and/or sub-pixels are omitted.

Figures 7A, 7B:
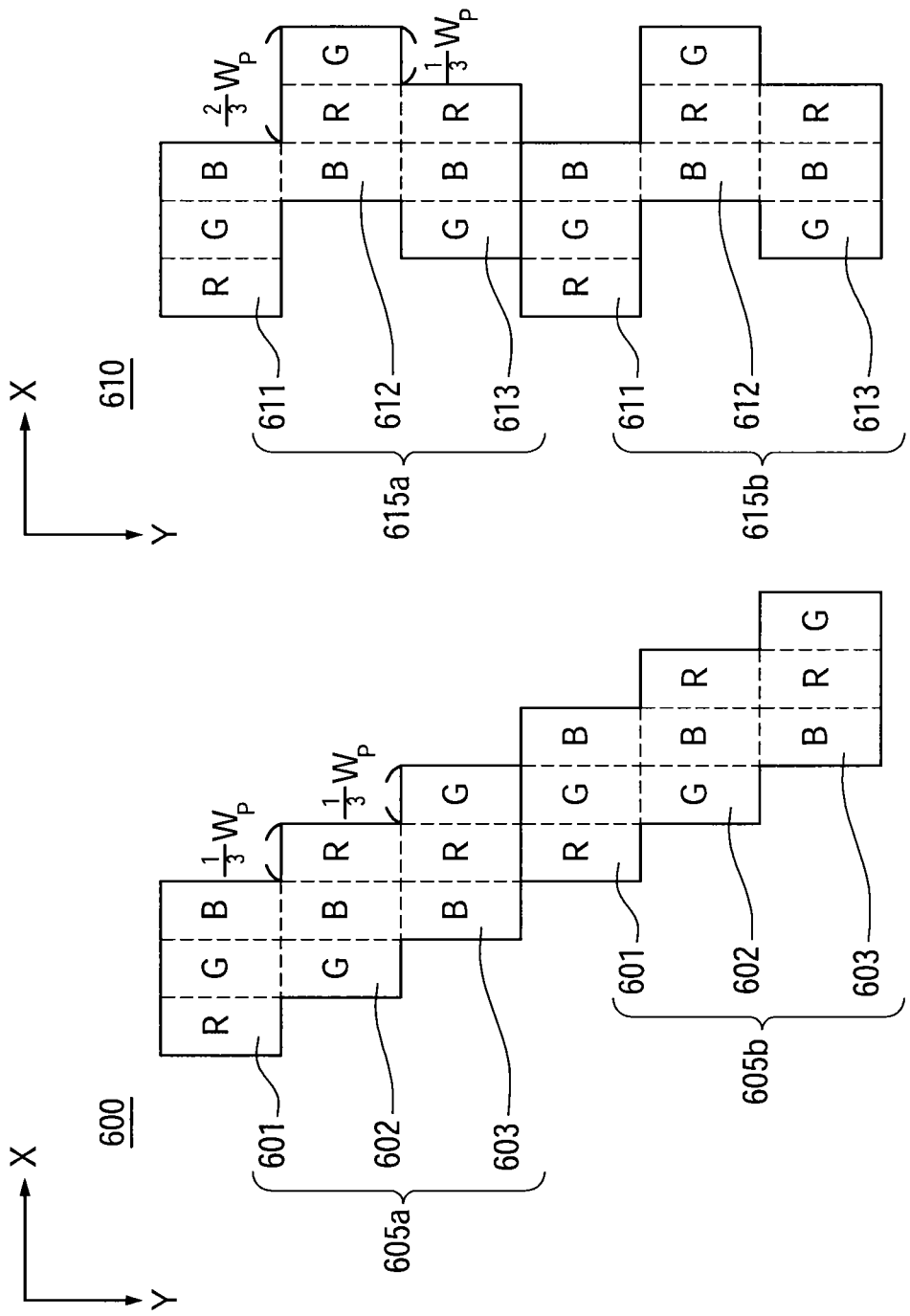
FIGS. 7A to 7E are schematic diagrams respectively illustrating exemplary arrangements of various third electrodes according to varieties of embodiments of the present invention.

In FIG. 7A, the third electrode 600 comprises two first portions 605a and 605b disposed along the Y direction. Each of the first portions 605a and 605b consists of three first segments 601, 602 and 603. The first segment 601 is disposed at the upper side and shifts by a distance of (Wp/3) to the left with respect to the first segment 602; whereas the first segment 603 is disposed at the lower side and shifts by a distance of (Wp/3) to the right with respect to the first segment 602. In this way, each of the first sub-pixels in the X direction of the pixel corresponding to each of the first segments 601, 602, and 603 of the first portions 605a and 605 b is R, G and B, respectively. Besides, the first segment 601 of the first portion 605b is disposed at the lower side and shifts by a distance of (Wp/3) to the right with respect to the first segment 603 of the first portion 605a.

Similarly, the third electrode 610 depicted in FIG. 7B comprises two first portions 615a and 615b disposed along the Y direction. Each of the first portions 615a and 615b consists of three first segments 611, 612 and 613. The first segment 611 is disposed at the upper side and shifts by a distance of (2 Wp/3) to the left with respect to the first segment 612; whereas the first segment 613 is disposed at the lower side and shifts by a distance of (Wp/3) to the left with respect to the first segment 612. In this way, each of the first sub-pixels in the X direction of the pixel corresponding to each of the first segments 611, 612, and 613 is R, B and G, respectively. Besides, the first segment 611 of the first portion 615b is disposed at the lower side and shifts by a distance of (Wp/3) to the left with respect to the first segment 613 of the first portion 615a.

As shown in both FIG. 7A and FIG. 7B, two first portions are arranged in the Y direction to form the third electrodes; however, the present invention is not limited thereto. Take FIG. 7A as an example, the numbers of first portion 605 of the third electrode 600 may be altered depending on the actual pixel arrangement. Also, it is also possible to alter the relative disposition of the first portions depending on situations and applications.

Moreover, the present invention is not limited to arranging multiple first portions in the Y direction to form the third electrodes; rather, it is possible to use two or more different step-shaped portions to form the third electrodes.

Figure 7D:
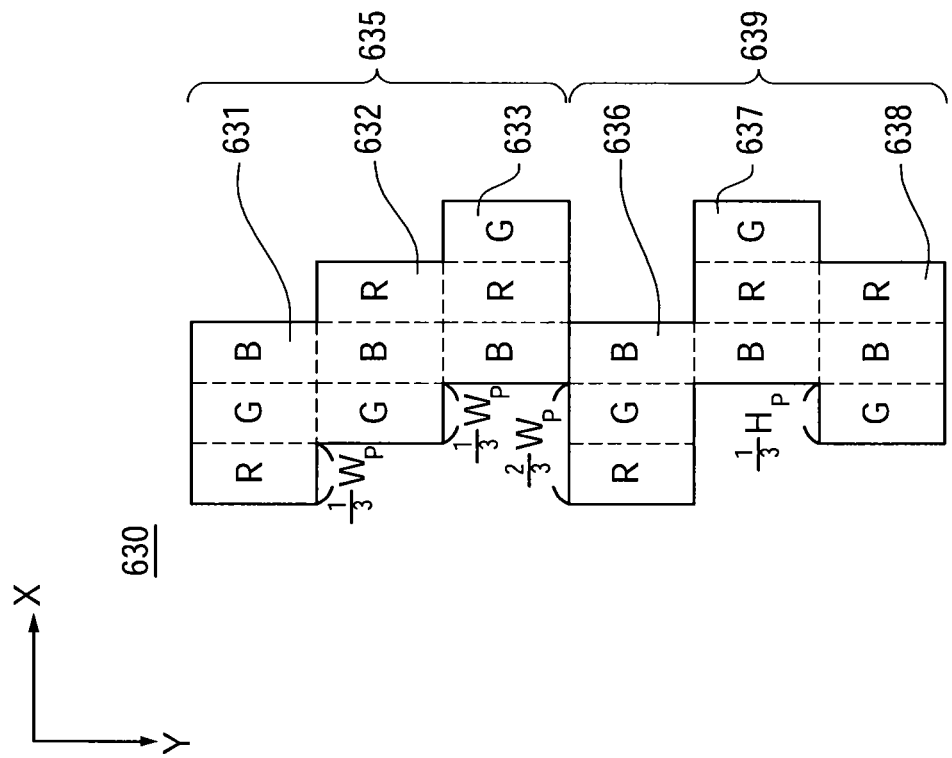
Figure 7C:
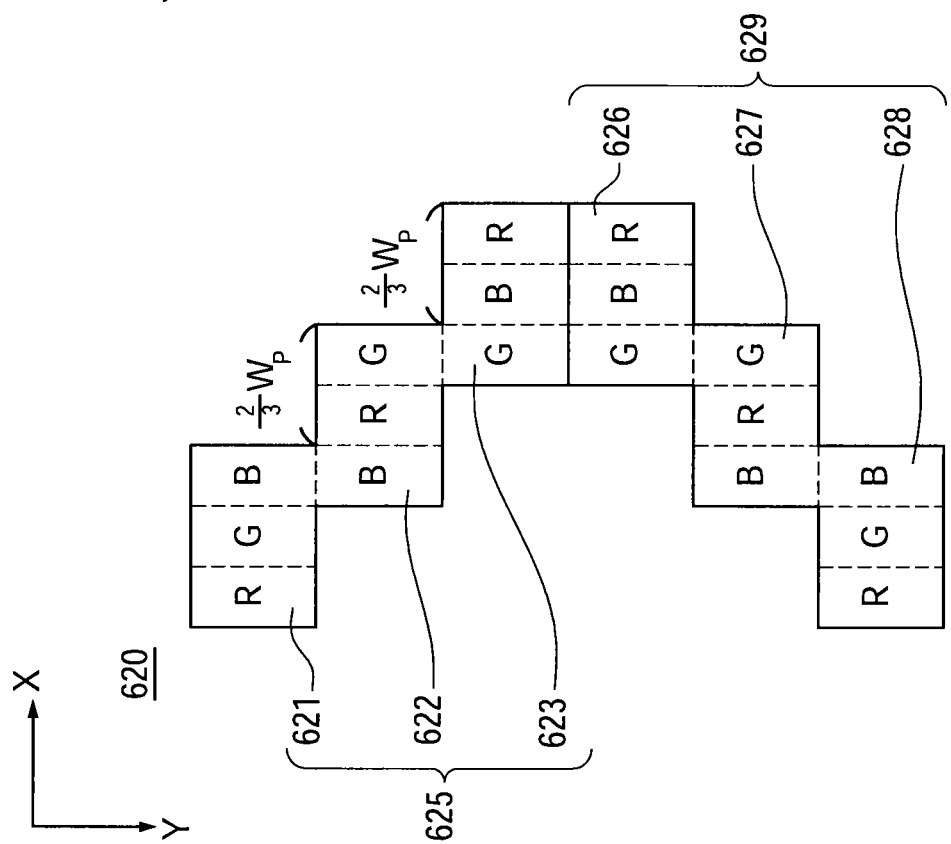

For example, as shown in FIG. 7C, the third electrode 620 comprises a first portion 625 and a third portion 629 disposed along the Y direction. More specifically, the first portion 625 comprises three first segments 621, 622 and 623, wherein the first segment 621 is disposed at the upper side and shifts by a distance of (2 Wp/3) to the left with respect to the first segment 622, whereas the first segment 623 is disposed at the lower side and shifts by a distance of (2 Wp/3) to the right with respect to the first segment 622. In this way, each of the first sub-pixels in the X direction of the pixel corresponding to each of the first segments 621, 622, and 623 is R, B and G, respectively. The third portion 629 mirrors the first portion 625. As such, each of the first sub-pixels in the X direction of the pixel corresponding to each of the third segments 626, 627, and 628 of the third portion 629 is G, B and R, respectively. In this example, since the third portion 629 is a mirror image of the first portion 625, there is no shift between the third segment 626 of the third portion 629 and the first segment 623 of the first portion 625.

In the embodiment illustrated in FIG. 7D, the third electrode 630 comprises a first portion 635 and a third portion 639 disposed along the Y direction. The arrangement of the first segments 631, 632 and 633 of the first portion 635 is the same as that of the first portion 605*a* as depicted in FIG. 7A, whereas the arrangement of the third segments 636, 637 and 638 is the same as that of the first portion 615*a* as depicted in FIG. 7B. In this way, each of the first sub-pixels in the X direction of the pixel corresponding to each of the first segments 631, 632, and 633 is R, G and B, respectively, whereas each of the first sub-pixels in the X direction of the pixel corresponding to each of the third segments 636, 637, and 638 is R, B and G, respectively. In the present example, the third segment 636 is disposed at a lower side and shifts by a distance of (2 Wp/3) to the left with respect to the first segment 633 of the first portion 635.

Figure 7E:
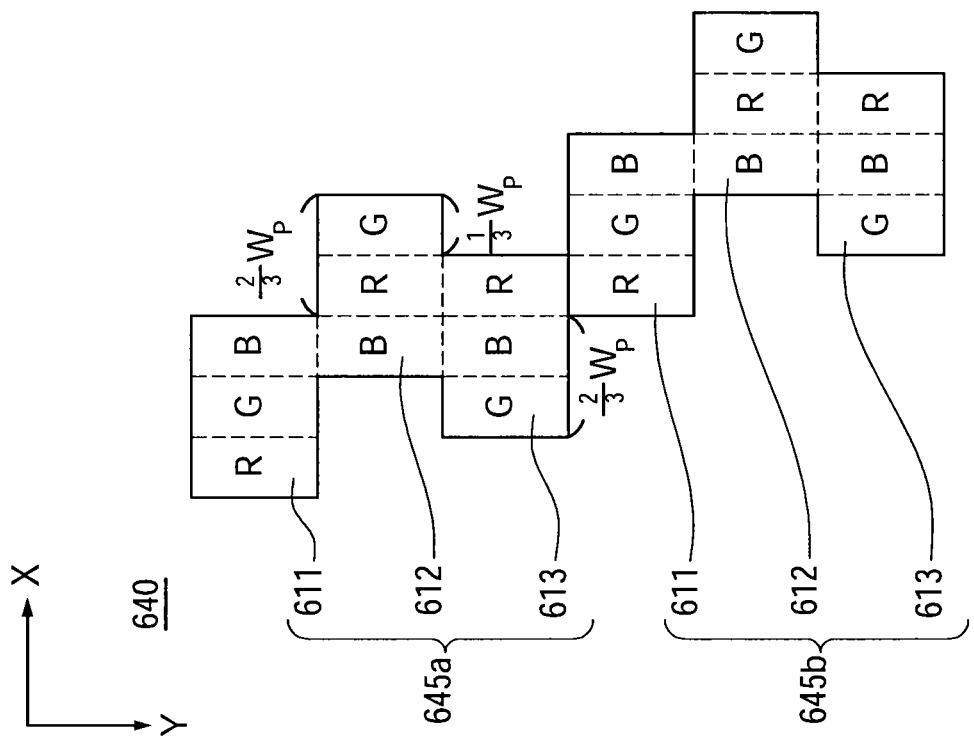

In FIG. 7E, the third electrode 640 comprises two first portions 645*a* and 645*b* disposed along the Y direction. The arrangements of the first portions 645*a* and 645*b* are the same as that of the first portions 615*a* and 615*b* as depicted in FIG. 7B, and hence, the reference numerals of the first segments of the first portions 615*a* and 615*b* are applied herein. The third electrode 640 of FIG. 7E differs from the third electrode 610 of FIG. 7B in that the first segment 611 of the first portion 645*b*, which is disposed at the lower side, shifts by a distance of (2 Wp/3) to the right with respect to the first segment 613 of the first portion 645*a*.

The exemplary electrode arrangements of the third electrodes illustrated in FIG. 7A to FIG. 7E are suitable for use in the parallax barriers 200 and/or 500 described hereinabove, so as to implant the present invention. Besides, although the examples depicted in FIG. 7A to FIG. 7E are directed to the arrangement of the third electrodes, those electrode arrangements are equally applicable to the forth electrode, such as the forth electrodes 226 or 526 described hereinabove. Moreover, in preferred embodiments, the arrangements of the third electrodes and the forth electrodes are complementary to each other.

In yet another aspect, the present invention is directed to a display device, which employs the parallax barrier according to the aspects/embodiments of the present invention. As such, the three-dimensional image rendered by the present display device is less likely to suffer from the chromatic aberration result from the viewing angle. Also, the viewing distances under different viewing modes may be kept similar by using the present display device.

According to one embodiment of the present invention, the display device comprises a display panel and a parallax barrier, such as the parallax barrier 200 or 500 described hereinabove. The display panel is operable to render a two-dimensional image; whereas the parallax barrier (such as parallax barrier 200 or 500) is operable to transform the two-dimensional image rendered by the display panel into a parallax image. The parallax image may provide a left-eye image and right-eye image to user's left and right eyes respectively, so that the user may perceive a three-dimensional image.

In the present embodiment, the display panel may comprise a liquid crystal display panel. The liquid crystal display panel may comprise, for example, a light source, a polarizer and a liquid crystal display unit. One example of the light source is a backlight module; however, the present invention is not limited thereto.

According to the principles and spirits of the present invention, in still another aspect, the present invention is directed to a method for forming an autostereoscopic image. Briefly, the method includes operating a parallax barrier (such as parallax barrier 200 or 500) to transform a two-dimensional image rendered by a display panel into a parallax image, wherein the parallax image may provide a left-eye image and a right-eye image to a user's left and right eyes respectively, so that the user's brain may perceive a three-dimensional image, as described in FIG. 5A and FIG. 6D.

According to various embodiments of the present invention, the method for forming an autostereoscopic image is suitable for use in forming autostereoscopic image under a first mode and/or a second mode. As used herein, the terms "first mode" and "second mode" generally refer to the viewing orientations of the display device, such as the portrait mode or the landscape mode. For example, the display device can be rotated respect to a base of an electronic device by 90 degrees thereby switching the display device from the portrait mode to the landscape mode.

Figure 8:
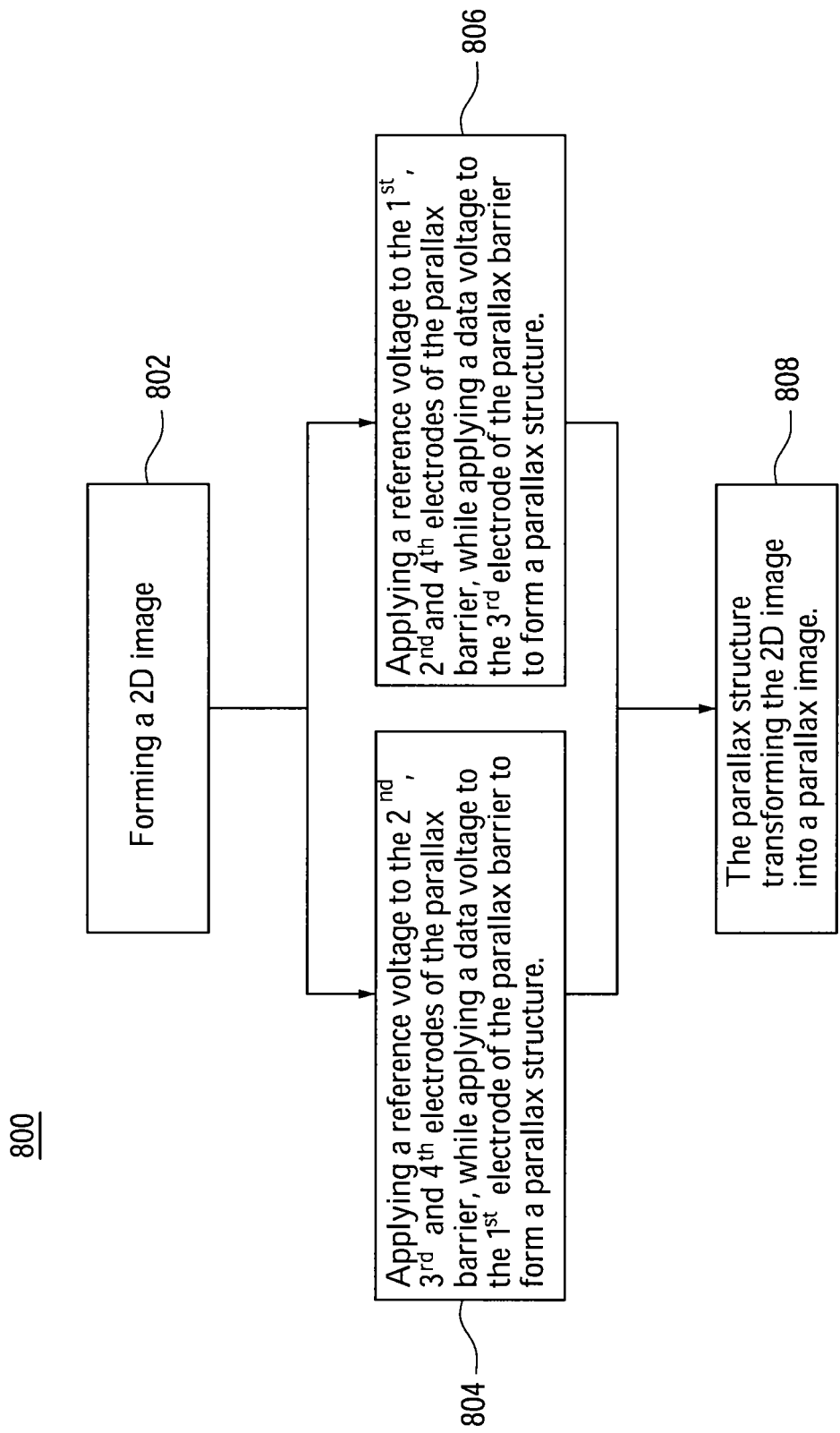
FIG. 8 is a flow chart illustrating the method for forming autostereoscopic images according to one embodiment of the present invention.

FIG. 8 is a flow chart illustrating the steps of a method 800 for forming autostereoscopic images according to one embodiment of the present invention.

In step 802, a two-dimensional image is rendered by using display panel (such as the display panel 550 described hereinabove) of a display device.

Also, the method 800 include a step of operating a parallax barrier according to the above-mentioned aspects/embodiments of the present invention (such as parallax barrier 200 or 500) to form a parallax structure.

Specifically, when the display device is operated under a first mode, a reference voltage is applied to the second electrodes, the third electrodes and the forth electrodes of the parallax barrier (such as parallax barrier 500), whereas a data voltage is applied to the first electrodes of the parallax barrier, so as to form a parallax structure (step 804).

Alternatively, when the display device is operated under a second mode, a reference voltage is applied to the first electrodes, the second electrodes and the forth electrodes of the parallax barrier, whereas a data voltage is applied to the third electrodes of the parallax barrier, so as to form a parallax structure (step 806).

Afterwards, in step 808, when the two-dimensional image rendered by the display panel passes through either parallax structures formed in step 804 or step 806, the two-dimensional image is transformed to a parallax image by the parallax structure.

The parallax image is capable of providing a left-eye image and a right-eye image to a user's left and right eyes respectively so that the user perceives a three-dimensional image.

Although the steps represented in FIG. 8 are presented in a specific order in order to illustrate the method according to one embodiment of the present invention, the present invention is not limited thereto. Rather, the disclosed subject matter encompasses variations wherein the steps and/or actions may be interchanged with one another without departing from the scope of the claims. In other words, unless a specific order of steps or actions is required for proper operation of the process that is being described, the order and/or use of specific steps and/or actions may be modified without departing from the scope of the claims. For example, in one embodiment, the step of forming a parallax structure (such as step 804 or step 806) may be carried out before the step of rendering the two-dimensional image (step 802). Alternatively, step 802 and step 804 (or step 806) may be carried out at the same time.

It will be understood that the above description of embodiments is given by way of example only and that various modifications may be made by those with ordinary skill in the art. The above specification and examples provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:
1. A parallax barrier, comprising:
   a first substrate;
   a plurality of first electrodes disposed on the first substrate along a first direction, wherein the first electrodes are strip-shaped and electrically connected to one another;
   a plurality of second electrodes disposed on the first substrate along the first direction, wherein the second electrodes are strip-shaped and electrically connected to one another, and the first electrodes and the second electrodes are arranged alternately;
   a second substrate;
   a plurality of third electrodes disposed on the second substrate along a second direction and electrically connected to one another, wherein each of the third electrodes comprises at least one first portion being step-shaped;
   a plurality of forth electrodes disposed on the second substrate along the second direction and electrically connected to one another, wherein each of the forth electrodes comprises at least one second portion being step-shaped, and the third electrodes and the forth electrodes are arranged alternately; and
   a liquid crystal layer disposed between the first substrate and the second substrate.

2. The parallax barrier of claim 1, wherein at least one of the first electrodes is disposed between the two adjacent second electrodes.

3. The parallax barrier of claim 1, wherein the first electrodes, the second electrodes, the third electrodes and the forth electrodes are made of a transparent conductive layer, respectively.

4. The parallax barrier of claim 1, wherein at least one of the first electrodes comprises:
   a plurality of transparent conductive patterns, the transparent conductive patterns being separated from one another; and
   at least one opaque bridging pattern for bridging the transparent conductive patterns so that the transparent conductive patterns are electrically connected to one another, wherein the at least one opaque bridging pattern is disposed above a gap between the adjacent third electrode and the forth electrode.

5. The parallax barrier of claim 1, further comprising at least one opaque bridging pattern, wherein the at least one opaque bridging pattern is disposed at an overlap between the first electrode and a gap between the two adjacent third electrode and forth electrode.

6. The parallax barrier of claim 1, wherein at least one of the third electrodes comprises:
   a plurality of transparent conductive patterns, the transparent conductive patterns being separated from one another; and
   at least one opaque bridging pattern for bridging the transparent conductive patterns so that the transparent conductive patterns are electrically connected to one another, wherein the at least one opaque bridging pattern is disposed above a gap between the adjacent first electrode and second electrode.

7. The parallax barrier of claim 1, further comprising at least one opaque bridging pattern, wherein the at least one opaque bridging pattern is disposed at an overlap between the third electrode and a gap between the two adjacent first electrode and second electrode.

8. The parallax barrier of claim 1, further comprising a black matrix layer for shielding a plurality of gaps between the first electrodes and the second electrodes or between the third electrodes and the forth electrodes.

9. The parallax barrier of claim 1, wherein each of the third electrodes further comprises a third portion, the third portion being step-shaped and mirroring the first portion.

10. A display device, comprising:
    a display panel, comprising a plurality of pixels being arranged in a pixel array along a first direction and a second direction, wherein each of the pixels has a width of Wp along the first direction and a height of Hp along the second direction, and each of the pixels comprises 3 sub-pixels, wherein each of the sub-pixels has a width of (Wp/3) along the first direction;
    a parallax barrier disposed at a side of the display panel, the parallax barrier comprising:
    a first substrate;
    a plurality of first electrodes disposed on the first substrate along the first direction, wherein the first electrodes are strip-shaped and electrically connected to one another;
    a plurality of second electrodes disposed on the first substrate along the first direction, wherein the second electrodes are strip-shaped and electrically connected to one another, and the first electrodes and the second electrodes are arranged alternately;
    a second substrate;
    a plurality of third electrodes disposed on the second substrate and electrically connected to one another, wherein each of the third electrodes comprises at least one first portion, the first portion comprises three first segments arranged along the second direction as step-shaped, and a step difference between any two adjacent first segments is (Wp/3) or (2Wp/3);
    a plurality of forth electrodes disposed on the second substrate and electrically connected to one another, wherein each of the forth electrodes comprises at least one second portion, the second portion comprises three second segments arranged along the second direction as step-shaped, a step difference between any two adjacent second segments is (Wp/3) or (2Wp/3), and the third electrodes and the forth electrodes are arranged alternately; and
    a liquid crystal layer disposed between the first substrate and the second substrate.

11. The display device of claim 10, wherein each of the adjacent first electrodes and second electrodes have a gap therebetween.

12. The display device of claim 10, wherein each of the adjacent third electrodes and forth electrodes have a gap therebetween.

13. The display device of claim 10, wherein the first electrodes, the second electrodes, the third electrodes and the forth electrodes are made of a transparent conductive layer, respectively.

14. The display device of claim 10, wherein at least one of the first electrodes comprises:
    a plurality of transparent conductive patterns, the transparent conductive patterns being separated from one another; and
    at least one opaque bridging pattern for bridging the transparent conductive patterns so that the transparent conductive patterns are electrically connected to one another, wherein the at least one opaque bridging pattern is disposed above a gap between the adjacent third electrode and the forth electrode.

15. The display device of claim 10, further comprising at least one opaque bridging pattern, wherein the at least one opaque bridging pattern is disposed at an overlap between the first electrode and a gap between the two adjacent third electrode and forth electrode.

16. The display device of claim 10, wherein at least one of the third electrodes comprises:
- a plurality of transparent conductive patterns, the transparent conductive patterns being separated from one another; and
- at least one opaque bridging pattern for bridging the transparent conductive patterns so that the transparent conductive patterns are electrically connected to one another, wherein the at least one opaque bridging pattern is disposed above a gap between the adjacent first electrode and second electrode.

17. The display device of claim 10, further comprising at least one opaque bridging pattern, wherein the at least one opaque bridging pattern is disposed at an overlap between the third electrode and a gap between the two adjacent first electrode and second electrode.

18. The display device of claim 10, further comprising a black matrix layer for shielding a plurality of gaps between the first electrodes and the second electrodes or shielding a plurality of gaps between the third electrodes and the forth electrodes.

19. The display device of claim 10, wherein each the third electrodes further comprising a third portion mirroring the first portion, and the third portion comprises three third segments arranged along the second direction as step-shaped, and a step difference between any two adjacent third segments is (Wp/3) or (2Wp/3).

* * * * *